US011888548B2

(12) United States Patent
Leeb et al.

(10) Patent No.: US 11,888,548 B2
(45) Date of Patent: Jan. 30, 2024

(54) POWER LINE COMMUNICATION FOR LOW-BANDWIDTH CONTROL AND SENSING

(71) Applicant: Massachusetts Institute of Technology, Cambridge, MA (US)

(72) Inventors: Steven B. Leeb, Belmont, MA (US); Leslie K. Norford, Lexington, MA (US); Erik K. Saathoff, Cambridge, MA (US); Adedayo O. Aderibole, Cambridge, MA (US); Kevin Kircher, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 17/804,165

(22) Filed: May 26, 2022

(65) Prior Publication Data

US 2022/0385335 A1 Dec. 1, 2022

Related U.S. Application Data

(60) Provisional application No. 63/194,562, filed on May 28, 2021.

(51) Int. Cl.
*H04B 3/56* (2006.01)
*H04B 1/69* (2011.01)
*H04L 27/10* (2006.01)

(52) U.S. Cl.
CPC .......... *H04B 3/56* (2013.01); *H04B 1/69* (2013.01); *H04L 27/10* (2013.01)

(58) Field of Classification Search
CPC .............. H04B 1/69; H04B 3/56; H04L 27/10
See application file for complete search history.

(56) References Cited

U.S. PATENT DOCUMENTS

| | | | |
|---|---|---|---|
| 4,438,519 | A | 3/1984 | Bose |
| 4,815,106 | A | 3/1989 | Propp et al. |
| 5,263,046 | A | 11/1993 | Vander Mey |
| 6,021,137 | A | 2/2000 | Kato et al. |
| 2004/0066283 | A1 | 4/2004 | Manis et al. |
| 2004/0125860 | A1 | 7/2004 | Tojo et al. |

OTHER PUBLICATIONS

Rinaldi et al. (NPL—"Design of a Time Dissemination System Using Chirp Modulation for Medium Voltage Smart Grid Applications", IEEE Transactions on Instrumentation and Measurement ( vol. 69, Issue: 9, Sep. 2020), accessed Jun. 3, 2023. | (Year: 2020).*
EDN (NPL—Narrowband Powerline Communication—Applications and Challenges—Part II), website: https://www.edn.com/narrowband-powerline-communication-applications-and-challenges-part-ii/ (Year: 2013).*
Girotto et al. "EMC Regulations and Spectral Constraints for Multicarrier Modulation in PLC" IEEE Access, vol. 5, 2017 (Year: 2017).*

* cited by examiner

*Primary Examiner* — David S Huang
(74) *Attorney, Agent, or Firm* — Daly, Crowley, Mofford & Durkee, LLP

(57) ABSTRACT

Described are power line communication (PLC) systems, devices and techniques which are reliable and suitable for use in control applications which can operate with relatively low data rates while complying with governing regulatory rules. Such systems, devices and techniques enable demand-side management of electrical loads in a building or facility or other environment.

20 Claims, 13 Drawing Sheets

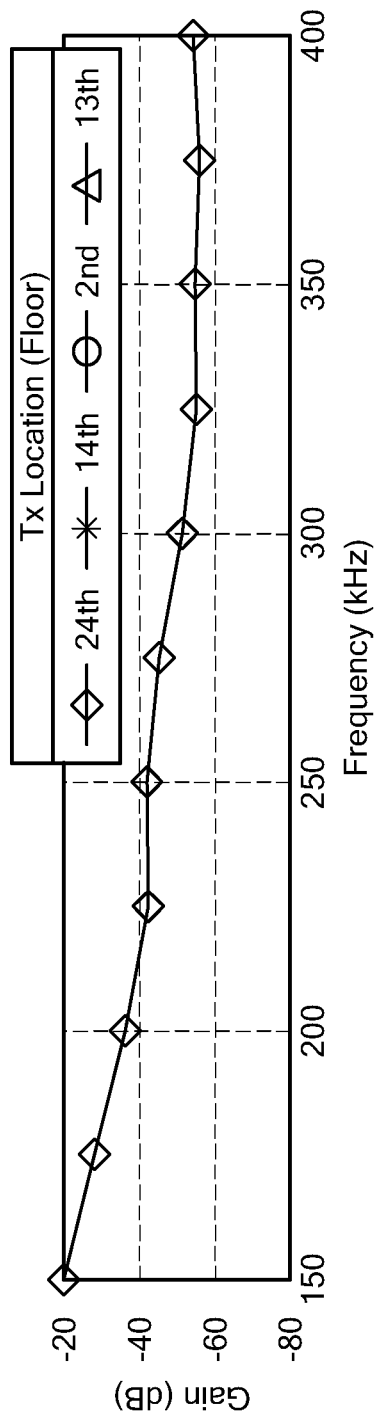
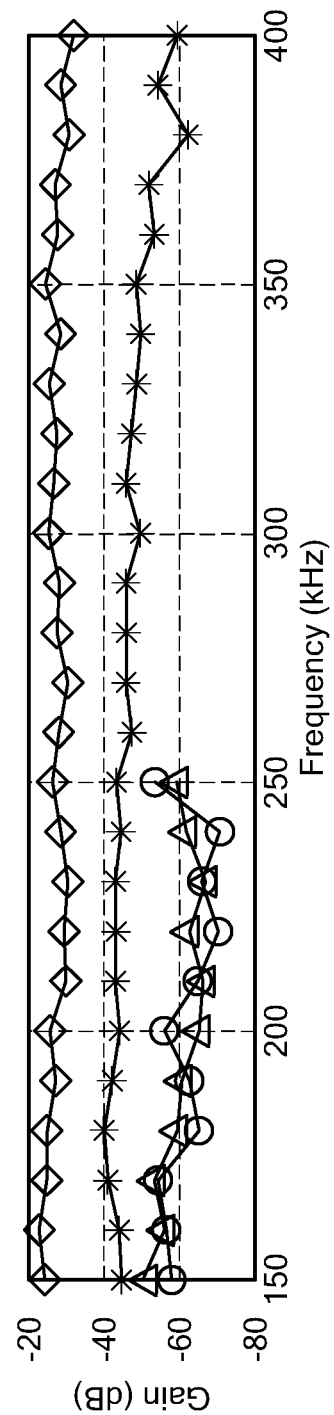
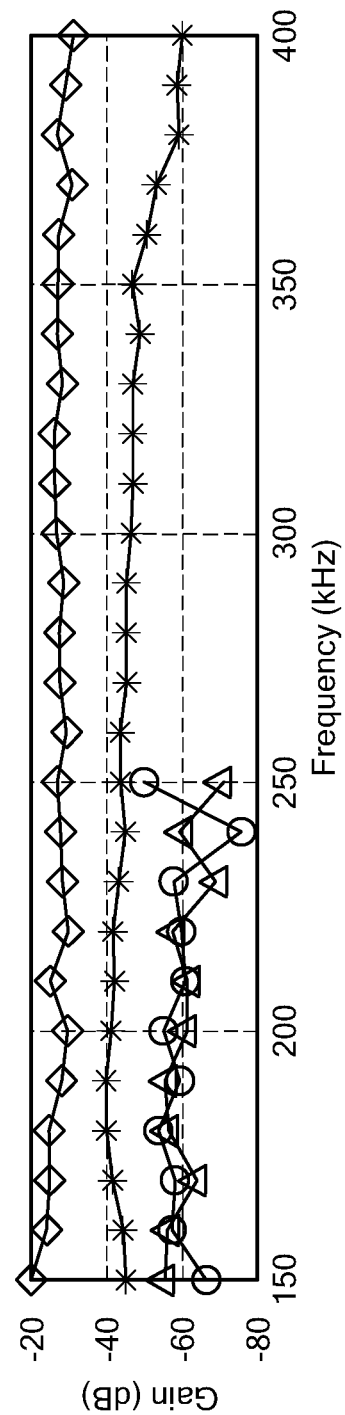
FIG. 8A
FIG. 8B
FIG. 8C

POWER LINE COMMUNICATION FOR LOW-BANDWIDTH CONTROL AND SENSING

CROSS-REFERENCE TO RELATED APPLICATIONS

This application claims the benefit under 35 U.S.C. § 119 of U.S. Provisional Patent Application No. 63/194,562 filed on May 28, 2021, which is hereby incorporated by reference herein in its entirety.

BACKGROUND

Energy conservation and management schemes based upon demand response typically require a communication channel. Communication requirements often add expense and may limit the penetration and efficacy of demand response or load control schemes. Effective communication is necessary not only to save energy and shave peak demand, but also to ensure the reliability of services such as hot water, air conditioning, and vehicle charging.

In an electrical power network (also sometimes referred to as an "electrical grid," a "utility grid," or more simply a "grid"), for example, power lines (also sometimes 1 referred to as "transmission lines") connect loads to energy control centers which function to ensure electricity continues to be generated, transmitted and distributed in a safe and reliable manner. Since the power lines connect loads to energy control centers, power lines are a potentially attractive communication channel (or communication medium) for demand response applications. While existing power lines were not designed for communication, attempts have been made for decades to use them as a communication medium. Power-line communication (PLC) was originally employed by power utility companies in the 1920s for long distance communication, remote monitoring, protection, and control of equipment coupled to a utility grid.

Electrical power networks that use digital communications technology to detect and react to local changes in usage (sometimes referred to as "smart grids") require bi-directional communication, inter-connectivity, and the intelligent automation of components on the electrical power network. PLC systems suitable for smart-grid applications such as load and peak demand management are frequently proposed, and PLC may also provide a route to protect against cyber-attacks and extreme environmental concerns.

Time-varying noise levels and poorly characterized line impedance, especially as loads connect and disconnect from the line, are major issues that affect the practical application of PLC. Power line noise may be synchronous or asynchronous with respect to the line-cycle and may include colored background and impulse noise. Power line noise is difficult to characterize and is not easily approximated as additive white Gaussian noise. Unpredictable signal attenuation, dependent on the time of day, frequency, distance, and electrical phase, deteriorates the received signal power in PLC systems. Network topology, multipath fading, and circuit loading also influence attenuation. The achievable performance of PLC systems is limited by impedance, bandwidth and electromagnetic compatibility (EMC) constraints enforced by regulatory bodies such as Federal Communications Commission (FCC) in the United States and Comité Européen de Normalisation Électrotechnique (CENELEC) in Europe.

Power-line communication (PLC) systems are often classified according to the frequency band in which they operate. Ultra-narrowband (UNB-PLC), narrowband (NB-PLC) and broadband (BB-PLC) operate in the 125 Hz-3-kHz, 3-500-kHz, and 1.8-100-MHz spectrum, respectively. NB-PLC is attractive for smart grid applications where reliability, coverage and robustness are the main concern, while BB-PLC is primarily employed in internet access applications for home and building area networks with limited range. Electromagnetic interference (EMI) regulations set the conducted and radiated emissions limits which determine the maximum transmitted communication signal power level for UNB-PLC, NB-PLC and BB-PLC systems. CENELEC defines the 3-148.5-kHz spectrum only for NB-PLC with conducted emissions constraints provided in European Norms (EN) 50065-1 in the form of peak, quasi-peak and average limits. EN 50065-1 does not provide radiation emissions limits for NB-PLC. In the United States, the FCC Part 15 specifies the 9-490-kHz spectrum for NB-PLC applications. However, no in-band conducted emissions limits are provided. Radiated emissions limits for NB-PLC are provided by the FCC in "Part 15: Regulations Jul. 10, 2008 from Federal Communications Commission Internet site http://www.fcc.gov/oet/info/rules/part15," PART15 0710-08. pdf, Tech. Rep., 15. In addition, non-regulatory bodies such as the Comité International Spé cial des Perturbations Radioélectriques (CISPR) and IEEE have proposed emission limits for NB-PLC in the 9-500-kHz spectrum in the CISPR 22 and IEEE 1901.2 standards, respectively.

In addition to EMI, PLC signals should be below certain limits to ensure the safety of equipment on the utility grid and operators. IEEE Standard (Std.) 519-2014 states that the voltage harmonics content at the interface between users in a system should be below the limits provided in "IEEE Recommended Practice and Requirements for Harmonic Control in Electric Power Systems," IEEE Std 519-2014 (Revision of IEEE Std 519-1992), pp. 1-29, 2014. Consequently, the total conducted emissions of PLC devices in a network should be such that the recommended voltage harmonics levels at the point of common coupling are not violated. Furthermore, periodic PLC signals can cause voltage or current surges that lead to equipment damage as stated in IEEE C62.41. The lower voltage limit surge protection equipment is able to withstand is 500 V. PLC signals should thus be kept far below this limit for safety. Finally, residual current devices at service panels activate in the presence of excessive common-mode current. To avoid tripping these devices, common-mode currents from PLC modems should respect the 30-mA limit specified in IEC 60755.

Despite the many challenges facing PLC, many researchers have highlighted the benefits of PLC in smart grid applications. In one illustrative embodiment, PLC was employed to create a network in a smart home for Internet of Things (IoT) applications. In this illustrative embodiment, a BB-PLC system provides internet access to the IoT network. Advanced metering infrastructure that enables two-way information exchange using PLC between utilities and consumers for improved energy consumption monitoring and customer billing have also been described. In one example, a reliable PLC system was designed to relay price and energy information to customers, enabling energy conservation benefits such as peak load shifting, shedding and automatic load controls. In another example, a PLC system achieved energy conservation via NB-PLC by broadcasting control commands to intelligent air conditioners. Such existing PLC systems in smart grids focuses on achieving high data rate communication.

SUMMARY

In accordance with the concepts, systems, and techniques described herein, it has been recognized that smart grid and demand response applications have relatively unique communication requirements that can be exploited to improve the utility of power-line communication (PLC) for control and monitoring. Specifically, many demand response and control applications require far lower bandwidths than other consumer applications of PLC like internet or land-line phone extenders.

In accordance with one aspect of the concepts described herein, it has been recognized that communication bandwidths of a few Hertz or less may be adequate for many control applications. Accordingly, described herein are a suite of techniques that can substantially enhance PLC communication reliability by taking advantage of requirements imposed by low-bandwidth communication. In embodiments, described us a technique to leverage a quasi-peak (QP) measurement technique, combined with chirp-binary orthogonal keying (BOK) modulation, to provide a PLC modem having reliability and coverage which is improved (and in some cases dramatically improved) relative to reliability and coverage for conventional PLC modems. It has been recognized that smart-grid applications, such as load control and demand response, can take advantage of enhanced coverage provided by PLC modems operating in accordance with the concepts and techniques described herein without being limited by low data rate.

In accordance with a further aspect of the concepts, systems, and techniques described herein, a system for controlling loads over a communication channel comprises means for using spread spectrum control signals having a chirp frequency range extending substantially over a quasi-peak (QP) frequency band. In embodiments, the communication channel corresponds to a PLC channel. In embodiments, the system may comprise a controller to provide control signals provided as chirp control signals having a chirp frequency range extending substantially over a quasi-peak (QP) frequency band. In embodiments, the control signals are provided as at least one of a wireless signal, an optical signal, an electrical power signal. In embodiments, the loads are controlled by a small number of bits. In embodiments, the control signals may be configured to either engage or disengage a load (e.g., turn a load on or turn a load off).

In accordance with a further aspect of the concepts, systems, and techniques described herein, a system for controlling loads over a communication channel further comprises means for training a plurality of loads to enable the means for training to select (or otherwise decide) a collection of loads to be turned on at a given point in time or over a given period of time.

With this particular arrangement, a system of self-organizing loads is provided. Such a system for controlling loads over a communication channel may further comprise means for utilizing a chirp signal detected with a quasi-peak (QP) regulatory emission standard.

In accordance with a further aspect of the concepts, systems, and techniques described herein, a modem operates in a low bandwidth communication channel with a chirp signal having a frequency range extending substantially over a full quasi-peak (QP) frequency band.

In accordance with a still further aspect of the concepts, systems, and techniques described herein, a communication system comprises means for providing control signals over a communication channel via a chirp signal having a frequency range extending substantially over a full quasi-peak (QP) frequency band.

In accordance with a still further aspect of the concepts, systems, and techniques described herein, a communication system includes a controllable device; a transmission medium; a modem coupled between the controllable device and the transmission medium, the modem configured to: receive signals from the device and modulate the signals for transmission over the transmission medium with a spread spectrum chirp transmitter; and receive modulated spread spectrum chirp signals propagating on the transmission medium, demodulate the spread spectrum chirp signals and provide the demodulated signals to the device; and meet quasi-peak (QP) signal levels. In embodiments, the modem is configured to modulate the signals with a chirp signal having a frequency range extending substantially over a full quasi-peak (QP) frequency peak (QP) frequency band. In embodiments, the device is one of: a controller, a sensor, or any controllable device.

In accordance with a still further aspect of the concepts, systems, and techniques described herein, a system for communicating data over a communications medium, the system comprising: means for transmitting binary data by: (a) defining a bit time interval during which a single bit of data is to be communicated; (b) converting each data bit to a first signal waveform having a first binary condition in the first and fourth quarters of the bit time interval and having the remaining binary condition in the second and third quarters of the bit time interval; (c) integrating the first signal waveform to obtain a triple-ramp waveform; (d) providing a transmitter having an output waveform of variable instantaneous frequency controlled by the instantaneous magnitude of an input waveform at a transmitter control input; (e) setting the transmitter to have a predetermined center frequency with a predetermined input waveform magnitude at the control input; and (f) applying the triple-ramp waveform as the input waveform to the transmitter control input to vary the instantaneous frequency of the transmitter output to have the center frequency at the beginning, midpoint and end of each bit time interval and to have a maximum frequency, greater than the center frequency, and then a minimum frequency, less than the center frequency, to transmit a data bit having a first binary data value and to have the minimum frequency and then the maximum frequency to transmit a data bit having a second binary data value; (g) conveying the transmitter output waveform over the medium to at least one receiver; and (h) recovering the binary data contained in the transmitter output waveform received signal at each of the at least one receiver by: (i) frequency-demodulating the frequency variations of the received signal; (ii) integrating the frequency-demodulated signal; and (iii) comparing the integrated and frequency-demodulated signal with a reference level to obtain the binary value of each data bit sent by the transmitter.

In accordance with a still further aspect of the concepts, systems, and techniques described herein, a method for communicating binary data over a communications medium, comprising: transmitting binary data by: (a) defining a bit time interval during which a single bit of data is to be communicated; (b) converting each data bit to a first signal waveform having a first binary condition in the first and fourth quarters of the bit time interval and having the remaining binary condition in the second and third quarters of the bit time interval; (c) integrating the first signal waveform to obtain a triple-ramp waveform; (d) providing a transmitter having an output waveform of variable instantaneous frequency controlled by the instantaneous magnitude of an input waveform at a transmitter control input; (e) setting the transmitter to have a predetermined center frequency with a predetermined input waveform magnitude at the control input; and (f) applying the triple-ramp waveform as the input waveform to the transmitter control input to vary the instantaneous frequency of the transmitter output to have the center frequency at the beginning, midpoint and end of each bit time interval and to have a maximum frequency, greater than the center frequency, and then a minimum frequency, less than the center frequency, to transmit a data bit having a first binary data value and to have the minimum frequency and then the maximum frequency to transmit a data bit having a second binary data value; conveying the transmitter output waveform over the medium to at least one receiver; and recovering the binary data contained in the transmitter output waveform received signal at each of the at least one receiver by: (a) frequency-demodulating the frequency variations of the received signal; (b) integrating the frequency-demodulated signal; and (c) comparing the integrated and frequency-demodulated signal with a reference level to obtain the binary value of each data bit sent by the transmitter.

In accordance with a still further aspect of the concepts, systems, and techniques described herein, a power line communication (PLC) modem comprising: a transmitter; a receiver; and multi-output (MIMO) coupler coupled to the transmitter and receiver and configured to interface with an electric utility.

In accordance with a still further aspect of the concepts, systems, and techniques described herein, a communication modem for implementing a low bitrate sensing and control protocol over a transmission medium, the communication modem comprising: a spread spectrum transmitter; and a spread spectrum receiver wherein the transmitter and receiver are configured to transmit and receive spread spectrum signals having a chirp frequency range extending substantially over a quasi-peak (QP) frequency band, the spread spectrum signals corresponding to low-bitrate, sensing and control signals. In embodiments, the modem is configured as a power line communication (PLC) modem for implementing a low bitrate sensing and control protocol over power lines.

In accordance with a still further aspect of the concepts, systems, and techniques described herein, a communication system comprising: a device a transmission medium; a modem coupled between to the power line and the device, the modem configured to: (c1) receive signals from the device and modulate the signals for transmission over the power with a spread spectrum transmitter; and (c2) receive modulated spread spectrum chirp signals propagating on the power line, demodulate the spread spectrum signals and provide the demodulated signals to the device wherein the emission levels of the spread spectrum signals meet quasi-peak (QP) regulatory limits. In embodiments, the modem transmits and receives spread spectrum signals in the 150-500 kHz frequency band. In embodiments, the transmission medium is a power line. In embodiments, the transmission medium is at least one of: a wireless signal path, an optical signal path or a wired signal path. In embodiments, the transmission device comprises any sensor product or controller capable of transmitting data. In embodiments, the device corresponds to one of a controller, a sensor, or any controllable device. In embodiments, the device is a receiver device. In embodiments, the receiver device is one of: a lighting device; or any controllable devices. In embodiments, the device is a transceiver device. In embodiments, the device is a transceiver device configured to both control and sense state information of the system.

DESCRIPTION OF THE SEVERAL VIEWS OF THE DRAWINGS

The manner and process of making and using the disclosed embodiments may be appreciated by reference to the figures of the accompanying drawings. It should be appreciated that the components and structures illustrated in the figures are not necessarily to scale, emphasis instead being placed upon illustrating the principals of the concepts described herein. Like reference numerals designate corresponding parts throughout the different views. Furthermore, embodiments are illustrated by way of example and not limitation in the figures, in which:

FIGS. 8A-8C are plots of channel gain vs. frequency of key communication links in the 24-floor high-rise apartment building on MIT campus with PLC receiver on 24th floor. (a) line-neutral channel. (b) neutral-earth channel. (c) line-earth channel;

DETAILED DESCRIPTION

Figure 1A:
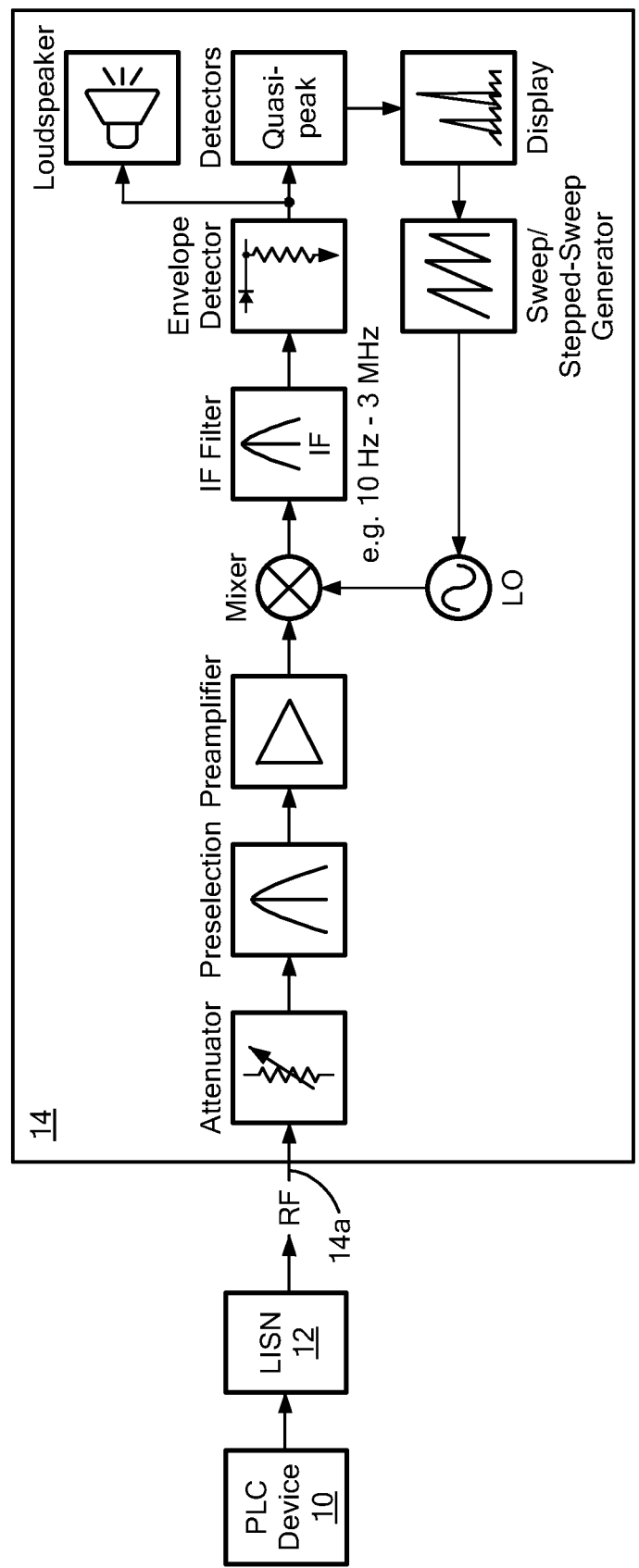
FIG. 1A is a block diagram of a system for measuring emissions.

Before describing the concepts, devices, systems and techniques sought to be protected, it should be understood that certain example embodiments are described. Some example embodiments are described using specific frequency ranges, chirp rates, chirp characteristics, power levels (e.g., transmitted power levels), specific types of chirp signals, frequency bandwidths. It should be appreciated and understood that such embodiments and specific characteristics are only for the purposes of illustration and to promote clarity in the description of the broad concepts sought to be protected and are not intended as, and should not be construed as, limiting.

In accordance with the concepts described herein, it has been recognized that as a result of the focus on achieving high data rate communication in power line communication (PLC) systems, attention has not been paid to exploring effective communication strategies for smart grid applications where reliability and coverage at low data rates are the primary concerns, especially in buildings with harmful attenuation levels.

Conventional high-speed PLC modems necessarily limit their transmitted power to satisfy peak conducted emission limits. As a result, high-speed PLC modems cannot provide reliable wide-range PLC in challenging communication channels.

However, in accordance with the concepts described herein, it has been recognized that for low-bandwidth communication applications, regulatory limits on quasi-peak conducted emissions permit transmitted power levels which are higher than those allowed by regulatory limits on peak conducted emissions.

Table I presents conducted emissions limits for narrowband power line communication (NB-PLC) enforced by some governing entities.

TABLE 1

CONDUCTED EMISSIONS LIMITS FOR NB-PLC.

| Frequency Range | P (dBµV) | QP (dBµV) | AV (dBµV) |
|---|---|---|---|
| 3 kHz-9 kHz[1] | 134 | — | — |
| 9 kHz-95 kHz[1] | 134-120[2] | — | — |
| 95 kHz-148.5 kHz[1] | 134[3]/122[4] | — | — |
| 150 kHz-500 kHz[5] | — | 115-105[2] | 105-95[2] |

[1]CENELEC EN 50065-1 regulatory limits.
[2]Decreases linearly with the logarithm of frequency.
[3]Limit for Class A (industrial-use) devices.
[4]Limit for Class B (general-use) devices.
[5]Recommended by IEEE in IEEE Std. 1901.2

An electromagnetic interference (EMI) analysis described herein also extends to radiated EMI. NB-PLC conducted emissions limits expressed in decibels over 1 microvolt (dbµV) are usually defined in terms of their peak (P), quasi-peak (QP) or average (AV) values. The NB-PLC conducted emissions limits defined by Comité Européen de Normalisation Électrotechnique (CENELEC) in EN 50065-1 are restricted to the 3-148.5-kHz range as shown in Table I. Only utility providers may use the 3-95-kHz range as dictated by EN 50065-1. General applications can make use of the 95-148.5-kHz band. IEEE Std. 1901.2 recommends QP and AV emissions limits given in Table I for the unregulated 150-500-kHz band. This standard does not impose a power (P) limit.

In view of the above and in accordance with the concepts described herein, it has been recognized that the devices, systems and techniques described herein may achieve robust and reliable low-data-rate NB-PLC on a 150-1500 kHz frequency band by leveraging the opportunity provided by the QP limits and measurement procedure as described herein.

Referring now to FIG. 1A, a PLC device 10 (as a device under test—DUT) is coupled though a line impedance stabilization network (LISN) 12 to an EMI measurement system 14. EMI measurement system 14 includes an input 14a at which is provided a radio frequency (RF) input signal from the DUT. EMI measurement system 14 includes an attenuator (e.g., a variable attenuator coupled to a preselection circuit. The preselection circuit may include circuitry which provides one or more of signal filtering and signal level adjustment top signals provided thereto. In some example embodiments, the preselection circuit may comprise a filter having pass band and rejection band characteristics that focus in on a measurement frequency band of interest for a test agency or a test entity. An output of the preselection circuit is coupled to an input of an RF amplifier. An output of the RF amplifier is coupled to an RF input of a first port of a mixer circuit. A second port of the mixer circuit is coupled to a local oscillator (LO) source. The mixer receives RF and LO signals at respective ports thereof and provides an intermediate frequency (IF) signal at a third port thereof. The IF signal has a frequency corresponding to a difference in frequency between the RF and LO signals.

An IF filter is coupled to the mixer IF port. The IF signal is thus filtered via the IF filter and provided to an input of an envelope detector. An output of the envelope detector is coupled to both a quasi-peak (QP) detector. The output of QP detector is coupled to a signal source (e.g., a sweep/stepped-sweep generator). The EMI measurement system of FIG. 1A illustrates a test system configuration recommended by Comité International Spécial des Perturbations Radioélectriques (CISPR) in CISPR 16-1-1.

As noted above, line impedance stabilization network (LISN) 12 is coupled between the PLC device under test (DUT) and the EMI receiver 14. The LISN presents a constant 50 ohm (Ω) impedance to the device under test (DUT) for high-frequency currents and blocks noise on the power line. The transmitted RF signal from the DUT 10 is pre-conditioned (e.g. amplitude adjusted and filtered via attenuator, preselection circuit and preamplifier) before down-mixing to an IF frequency signal (baseband) for further processing. The signal source (e.g., the sweep or stepped-sweep generator) sets the output of an local oscillator (LO) to cover the frequency range of interest designated by the EMC standard. In one example embodiment, the intermediate frequency (IF) filter is provided having a 6-dB bandwidth of 8-10 kHz which filters the IF signal provided by the mixer. In embodiments, the center frequency of the IF filter can be between 10 Hz and 3 MHz.

The IF signal is provided to an envelope detector. An output of the envelope detector is coupled to a QP detector and optionally other devices (e.g., a loudspeaker as shown in FIG. 1A). The output of the QP detector is coupled to an input of the signal source (e.g., a sweep/stepped-sweep generator).

Figure 1B:
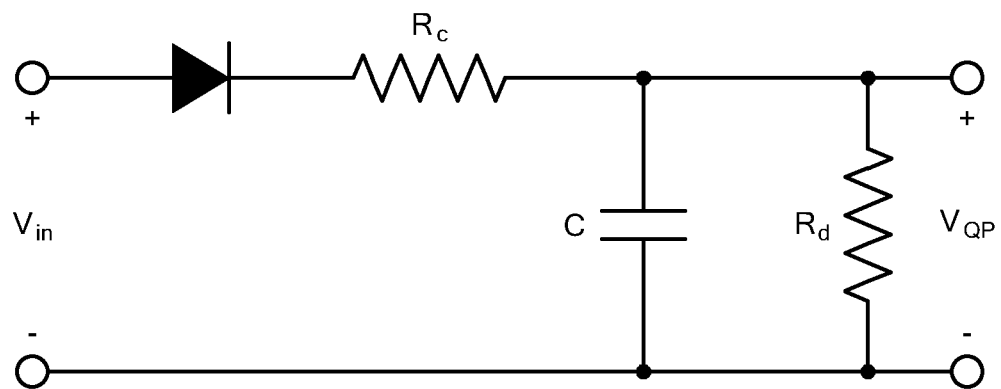
FIG. 1B is a schematic diagram of a quasi-peak (QP) detector circuit.

Referring now to FIG. 1B, a quasi-peak (QP) detector circuit (or more simply a QP detector) has a pair of input terminals across which an input voltage $V_{IN}$ may be provided and a pair of output terminals at which a QP voltage $V_{QP}$ is provided. The QP detector comprises a diode have a first terminal coupled to a first input terminal of the QP detector and a second terminal coupled to a first terminal of a resistor $R_c$. A second terminal of resistor $R_c$ is coupled to a first terminal of a capacitor C, A second terminal of capacitor C is coupled to the second input/output terminals of the QP detector circuit. A resistor $R_d$ is coupled across the output terminals of the QP detector circuit.

Figure 1C:
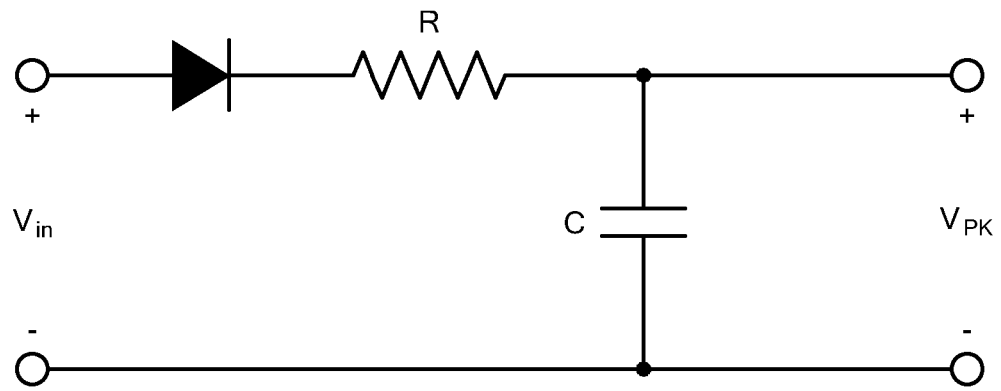
FIG. 1C is a schematic diagram of a peak detector circuit.

Referring now to FIG. 1C, a peak (P) detector circuit (or more simply a peak detector) has a pair of input terminals across which an input voltage $V_{IN}$ may be provided and a pair of output terminals across which a peak voltage $V_P$ is provided. The peak detector comprises a diode have a first terminal coupled to a first input terminal of the peak detector circuit and a second terminal coupled to a first terminal of a resistor R. A second terminal of resistor R is coupled to a first terminal of a capacitor C, A second terminal of capacitor C is coupled to the second input/output terminals of the peak detector circuit. A resistor $R_d$ is coupled across the output terminals of the QP detector circuit.

As described above, the QP and P detector circuits in FIGS. 1B and 1C generate, respectively, the quasi-peak voltage and peak voltage values of the signal's envelope respectively (e.g., as provided by an envelope detector such as the envelope detector of FIG. 1). These values are measured by a second-order critically-damped indicating instrument. The circuit in FIG. 1C can also generate an average (AV) voltage value when the diode is replaced by a buffer. The resulting measurements vary depending on the structure and bandwidth of the input RF signal, and parameters of the IF filter and detectors.

Leveraging the QP regulatory limits to achieve high reliability in low-bandwidth PLC systems starts with examining the QP detector in more detail. The QP detector given in FIG. 1B is consistent with EMI testing standards defined by CISPR in CISPR, "22: Information technology equipment radio disturbance characteristics limits and methods of measurement IEC," 2005. When the envelope detector generates a pulse at Vin, it charges the capacitor through resistor $R_c$. When Vin is below VQP, the capacitor discharges through resistor Rd. CISPR provides the necessary charging and discharging time constants. Given various RF input signals with equal amplitude, the QP detector will generate a lower QP value as either the signal's pulse width or pulse frequency decreases.

Figure 2:
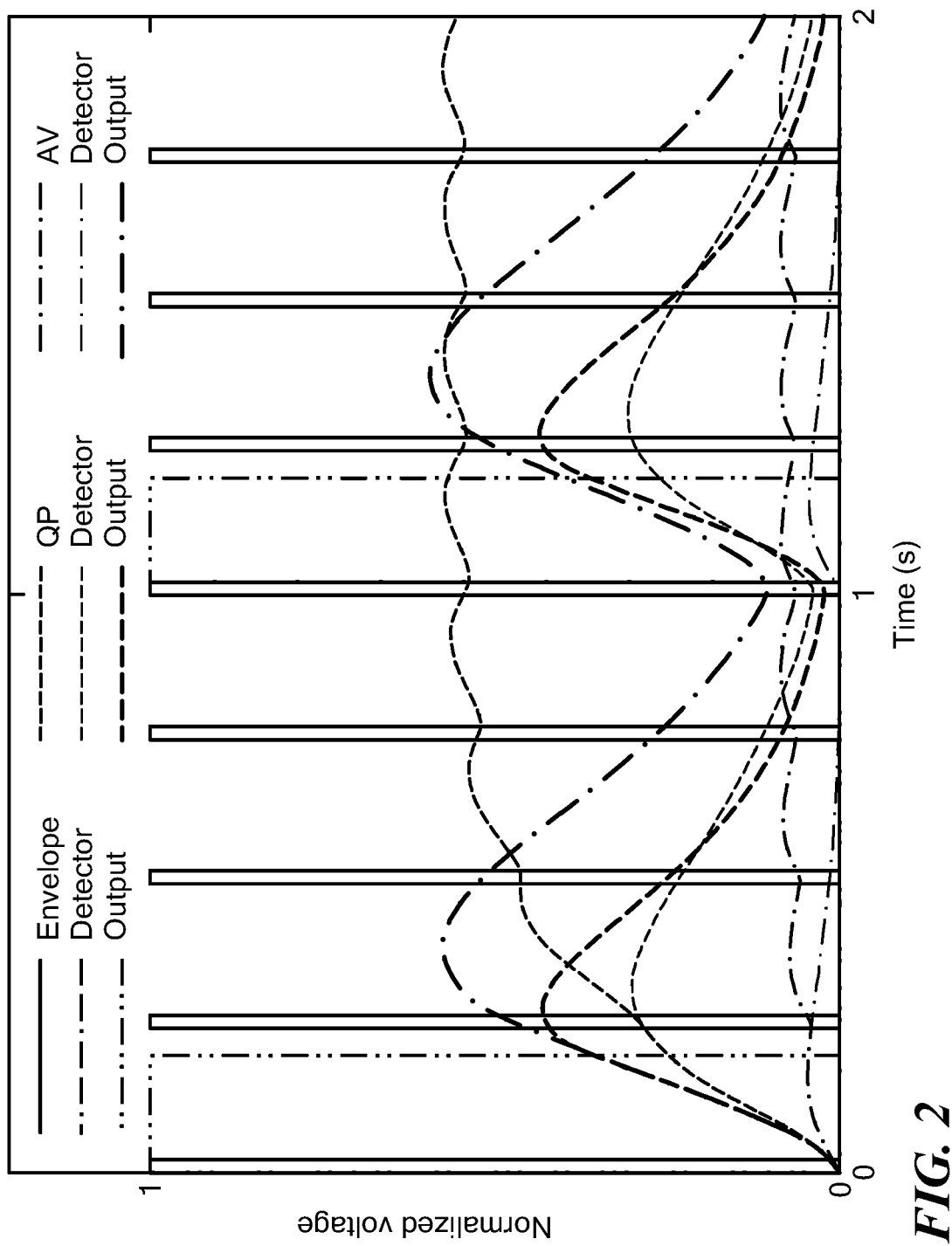
FIG. 2 is a plot of normalized voltage vs. time which illustrates the impact of pulse width and period on the output of the QP and AV detectors.

FIG. 2 demonstrates this phenomenon by varying the pulse width and pulse frequency of a potential transmitted signal. PLC systems generally encode a data symbol in each transmission pulse, so the QP value will increase as the symbol rate increases. The AV value of a short pulse is usually significantly lower than the QP value as shown in FIG. 2. Thus, the QP value is most often the limiting factor in maximum transmitted power.

The IF filter only allows the EMI receiver in FIG. 1A to capture energy within its pass band. Signals with larger bandwidths than the IF filter (e.g., the IF filter of FIG. 1) have a lower QP value than signals with a single carrier frequency. A chirp signal is one way to distribute (or spread) the spectral content partially outside the bandwidth of the IF filter. Instantaneously, the chirp signal is a single frequency that can pass through the IF filter during some part of the frequency sweep. The rate of the frequency sweep, combined with the bandwidth of the IF filter, sets the width of the pulse on the envelope detector output. Thus, a faster sweep rate reduces both the effective pulse width and the resulting QP value as shown in FIG. 2. When compared with a single carrier frequency signal, this wide-bandwidth chirp can achieve a lower QP value at frequencies common to both signals.

The EMI measurement procedure may be simulated to determine the maximum allowable transmitted power for various NB-PLC carriers.

Figure 3:
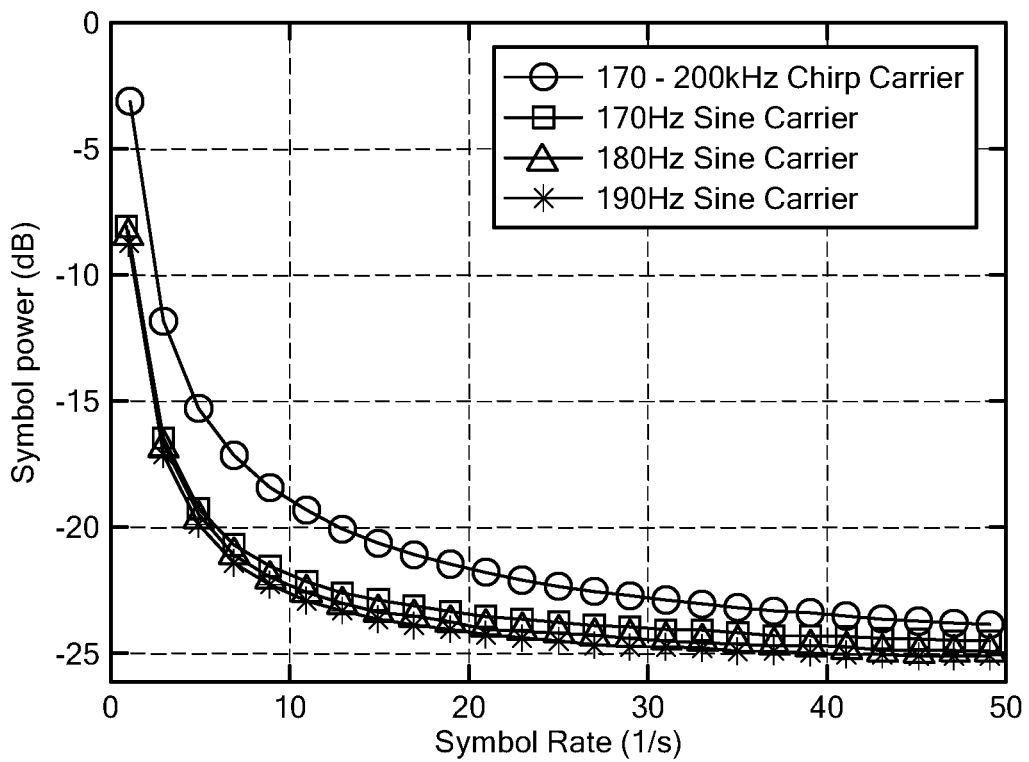
FIG. 3 is a plot of symbol power vs. symbol rate which illustrates the impact of quasi-peak (QP) limits on maximum transmitted power of various carrier signals when varying a symbol rate.
Figure 4:
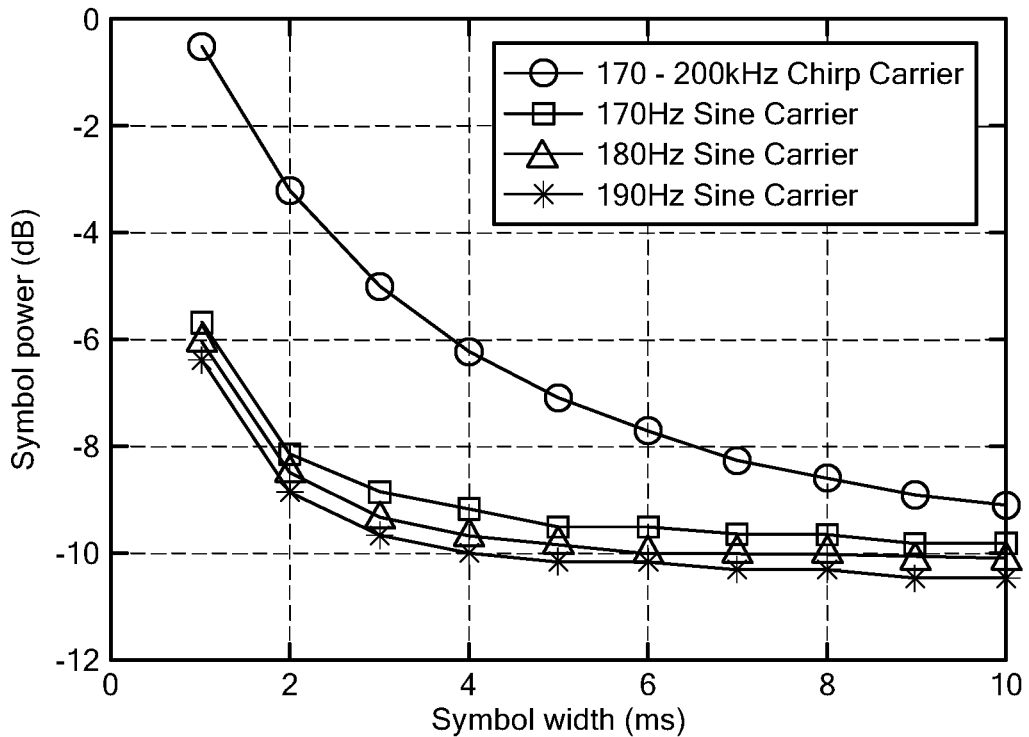
FIG. 4 is a plot of symbol power vs. symbol width which illustrates the impact of quasi-peak (QP) limits on maximum transmitted power of various carrier signals when varying pulse width.

FIGS. 3 and 4 illustrate the impact of symbol rate, symbol width, and carrier type on the maximum achievable transmitted power.

FIG. 3 illustrates the maximum transmitted power per symbol increases as the symbol rate decreases, as long as the symbol width is held constant and the QP value is always at the limit. This effect is mainly driven by the discharge time of the QP detector.

FIG. 4 illustrates that maximum transmitted power per symbol increases as the width of the carrier pulse decreases. The nature of the QP filter creates this effect, and charging time determines what range of pulse widths permit higher power levels. Low-data-rate NB-PLC can utilize significantly higher transmitted power, and thus provides the best chance to achieve wide coverage and high reliability for smart grid PLC applications. The control of slow-switching heating, ventilation, and air-conditioning (HVAC) loads for demand-side management does not require high data throughput, and is an ideal application for low-data-rate NB-PLC.

The structure of the symbol carrier also impacts the transmitted symbol power. Frequency modulated carriers, with spectral content wider than the IF filter pass band, can transmit more power as shown in FIGS. 3 and 4. The chirp signal is a customizable signal. That is, certain characteristics of the chirp signal are customizable including, but not limited to the start and stop frequencies, the sweep time and/or chirp rate). Since the chirp signal is a customizable signal, this leverages the characteristics of the EMI setup to operate at higher signal power. Thus, NB-PLC systems that encode data using signals similar to chirp signals can transmit more power per symbol than systems that employ single frequency carriers, such as binary phase shift keying or frequency shift keying (FSK). Although the injected signals used for FIGS. 3 and 4 do not violate conducted emissions limits, safety limits such as surge voltage may be considered during system design.

By spreading the carrier spectrum to occupy a wide range of the allocated frequency band, spread-spectrum communication can combat narrowband frequency-selective attenuation and multipath fading in PLC channels. Direct-sequence, frequency-hopping, and chirp are the most common spread-spectrum techniques. Chirp spread spectrum does not require accurate synchronization between the receiver and transmitter, which reduces the complexity of receiver circuits. Chirp signals can encode each symbol into a wide frequency range. As discussed above, this property allows for higher transmitted power and thus higher received power due to the properties of the EMI measurement setup. her spread-spectrum methods, such as direct-sequence and frequency-hopping, employ narrowband carrier signals and thus have more stringent transmitted power limits.

The time-domain representation of a chirp pulse waveform is $$x(t)=A(t)\cos[\Theta(t)]$$

where $\Theta(t)$ is the phase and $A(t)$ is the amplitude in the interval $0 \leq t \leq T$. T is the symbol duration.

The instantaneous frequency, f(t) is $$f(t) = \frac{1}{2\pi} \frac{d\theta(t)}{dt} \qquad (2)$$

while the chirp rate, µ(t) is $$\mu(t) = \frac{df(t)}{dt} = \frac{1}{2\pi} \frac{d^2\theta(t)}{dt^2}. \qquad (3)$$

Chirp spread spectrum is achieved by spreading the instantaneous frequency, f(t), across the frequency band of interest throughout the symbol duration. For linear chirps, f(t) varies linearly with time and the chirp rate is constant.

An example embodiment described herein employs linear chirp signals that occupy part of the 150-500-kHz NB-PLC spectrum. The transmitted power increases as the bandwidth of the signal increases, and this property heavily affects the careful selection of chirp signal bandwidth. However, the higher frequency components of the carrier signal are more susceptible to PLC channel attenuation, and this effect limits the practical chirp signal bandwidth. This effect will be discussed below. When setting the bandwidth, the level of power transmitted and the fraction of power exposed to high levels of attenuation create a trade-off.

Next described is a proposed modulation scheme in accordance with the concepts described herein. An example embodiment described herein employs binary orthogonal keying (BOK) as a preferred modulation scheme. A digital bit "1" is encoded by a linear chirp signal with a positive chirp rate, +|µ|. This is known as an "up-chirp". A "down-chirp" has a negative chirp rate, −|µ|, and represents a digital bit "0". A "down-chirp" is represented by $$x_0(t) = A_0(t)\cos[2\pi f_0 t - \pi|\mu|t^2 + \Theta_0] \qquad (4)$$

while an "up-chirp" is represented by $$x_1(t) = A_1(t)\cos[2\pi f_0 t + \pi|\mu|t^2 + \Theta_0], \qquad (5)$$

In equations (4) and (5), $f_0$ is the frequency at t=0 and $\Theta_0$ is the initial phase.

A conventional receiver required to demodulate known signals in the presence of noise may comprise matched filters, envelope detectors, and threshold detectors.

Next described is a proposed receiver in accordance with the concepts described herein. In contrast to a conventional receiver, a receiver provided in accordance with the concepts described herein comprises matched filters given by:

$$g_i(t) = \int_0^T h_i(t-\tau)r(\tau)/\tau, \quad 0 < t < T \qquad (6)$$

where i=0, 1 corresponds to the received "down-chirp" and "up-chirp" signals respectively; and τ is a dummy variable.

The impulse responses of the "down-chirp" and "up-chirp" are, respectively, given by:

$$h_0(t) = x_0(T-t) = x_1(t) \qquad (7)$$

and $$h_1(t) = x_1(T-t) = x_0(t). \qquad (8)$$

The received signal, r(t), is $$r(t) = \alpha(t)x_i(t) + n(t) \qquad (9)$$

if a transmitted symbol is present or $$r(t) = n(t) \qquad (10)$$

if absent, where n(t) is band-limited noise and α(t) is the channel gain. Due to the infrequent transmission of carrier signals required in low-bandwidth control and sensing applications, the absent-signal case must be considered.

In accordance with the concepts sought to be protected herein, described is a pseudo-binary receiver to determine the presence of xi(t) in r(t). The envelope peaks of g0(t) and g1 (t) may be computed and compared to known thresholds to completely demodulate the received signal. Assuming equal energy in x0(t) and x1 (t), the received bit is determined by the proposed receiver to be "1" if $$\overline{g_1(t)} - \overline{g_0(t)} > \frac{N_0}{2}\ln\left(\frac{P_0}{P_1}\right) \qquad (11)$$

and $$\overline{g_1(t)} > \frac{1}{2}\int_0^T x_1^2(t) + \frac{N_0}{2}\ln\left(\frac{P_3}{P_1}\right) \qquad (12)$$

are satisfied. In these conditions:
$\overline{g_i(t)}$ denotes the peak of the i-th matched filter's output envelope and $N_0$ is the noise power.
$P_i$ is the a priori probability corresponding to (9) and P2 is the a priori probability corresponding to (10).
Conversely, the received bit is determined to be "0" if $$\overline{g_0(t)} - \overline{g_1(t)} > \frac{N_0}{2}\ln\left(\frac{P_1}{P_0}\right) \qquad (13)$$

and $$\overline{g_0(t)} > \frac{1}{2}\int_0^T x_0^2(t) + \frac{N_0}{2}\ln\left(\frac{P_2}{P_0}\right) \qquad (14)$$

are satisfied. Otherwise, r(t)=n(t) is said to be correct.

In embodiments, a PLC modem provided in accordance with the concepts described herein comprises a transmitter and receiver, which interface with an electric utility. In embodiments, the transmitter and receiver may interface with the electric utility through a shared multi-input and multi-output (MIMO) coupler.

Figure 5A:
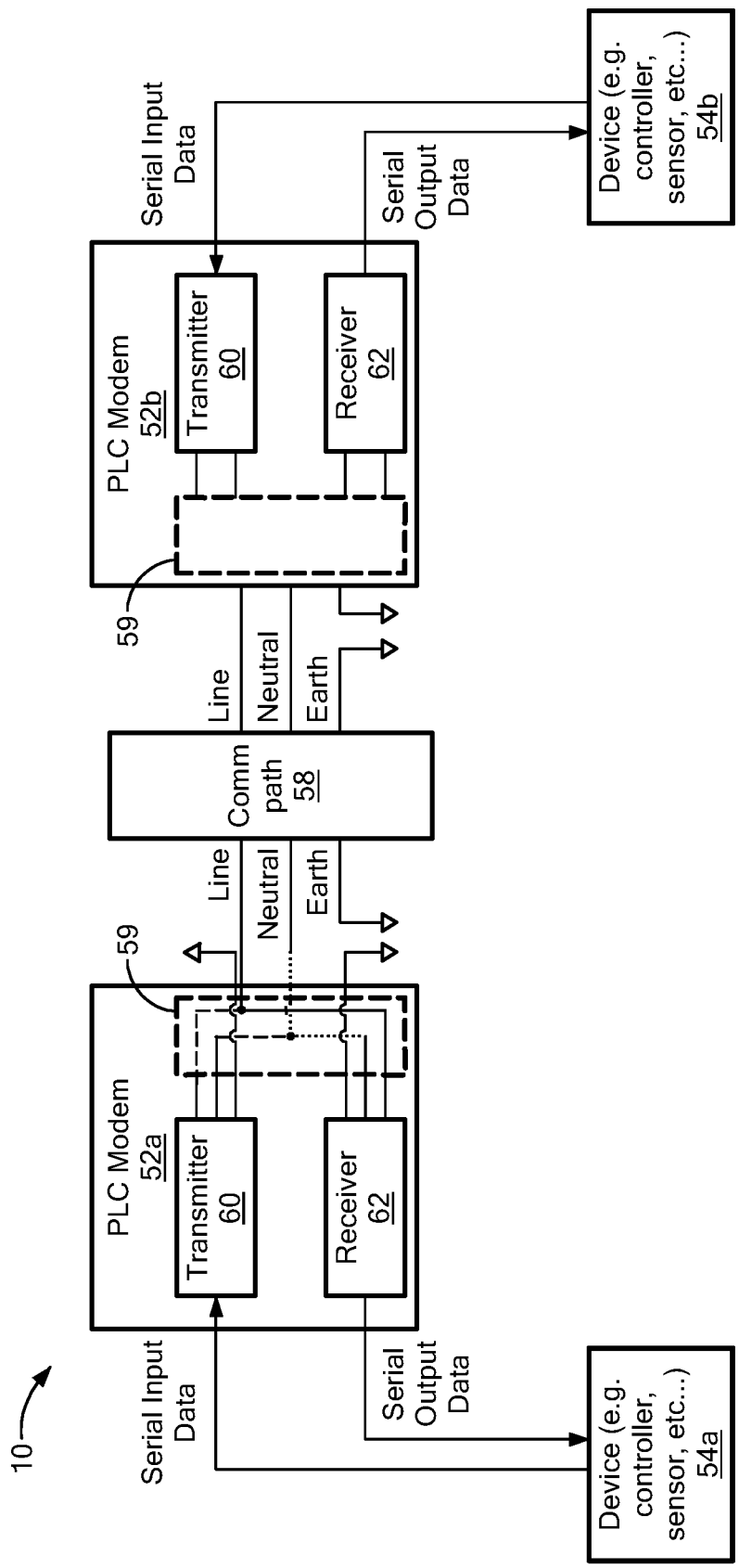
FIG. 5A is a block diagram of a PLC communication system provided in accordance with the concepts described herein.

Referring now to FIG. 5A, an illustrative PLC communication system 50 comprises a pair of communication devices in the form of PLC modems 52a, 52b in communication with devices 54a, 54b. In this example embodiment, modem 52a, is coupled to device 54b via a communication path 58 (which may comprise one or more power lines) and modem 52b, is coupled to device 54a via communication path 58. The devices 54a, 54b may be any of: a controller, a sensor, an electrical load or any controllable device. In accordance with the concepts described herein, modems 52a, 52b operate over communication channel 58 using spread spectrum control signals having a chirp frequency range extending substantially over a quasi-peak (QP) frequency band.

Modems 52a, 52b comprise a transmitter 60 and a receiver 62. The modems 52a, 52b are configured to transmit and/or receive signals from the devices 54a, 54b via the transmitter 60 and receiver 62. Modems 52a, 52b further comprises a coupler which couples signals between the communication path (e.g., power lines) to the transmitter 60 and/or receiver 62. In embodiments, coupler 59 may be provided as a multiple input/multiple output (MIMO) coupler.

In a transmit operation, a modem modulates a signal from one of devices 54, 56 for transmission over power lines (e.g., communication path 58) with a spread spectrum transmitter 60. In a receive operation, modems 52a, 52b receive modulated spread spectrum chirp signals propagating on the power line, demodulate the spread spectrum signals and provide the demodulated signals to the device (e.g., one of devices 54a, 54b) wherein the emission levels of the spread spectrum signals meet quasi-peak (QP) regulatory limits.

It should be appreciated that one or more of the devices 54a, 54b may correspond to a load such as an electrical load coupled to an electrical grid. Coupling a PLC modem 52a, 52b to a load, enables communication from one device (or a controller) to another device. Such communication may be used to control one or more of the loads. Such control may include, but is not limited to, turning a load on and/or off. Thus, PLC modems provided in accordance with the concepts, circuits and techniques described herein enables a system for controlling loads over a communication channel using spread spectrum control signals having a chirp frequency range extending substantially over a quasi-peak (QP) frequency band. It should also be appreciated that a modem (such as one of modems 52a, 52b) may be integrated with a device (such as one of devices 54a, 54b). That is, although the modems and devices in FIG. 5A are shown as separate elements/components, this has been done to promote clarity in the description and it should be appreciated that in embodiments, a single component may comprise both the modem and the device (i.e., a modem and device may be part of the same physical unit or component). Thus, in some embodiments it may be desirable or necessary to provide the modem as a component separate from, but coupled to a device and in other embodiments it may be desirable or necessary to provide the modem and device as a single component.

In embodiments, a controller may provide control signals wherein the control signals are provided as chirp control signals having a chirp frequency range extending substantially over a quasi-peak (QP) frequency band. For example, device 54a may generate or cause the generation of such control signals which control device 54b. In embodiments, the control signals are provided as at least one of a wireless signal, an optical signal, an electrical signal. In embodiments, the loads are controlled by a selected number of bits. In embodiments, a relatively small number of bits may be used (e.g., a number of bits less than a number of bits conventionally used to control a particular device). In embodiments, the number of bits may be one byte of data (where a byte may correspond to some number of bits on the range of 1 bit to 1024 bits; for example, a byte may correspond to eight bit byte of data, a sixteen bit byte of data, a thirty-two bit byte of data or a sixty-four bit byte of data, etc.). In embodiments, the number of bytes may range from one (1) to eight (8) bytes of data or in some embodiments from one (1) to three (3) bytes of data. After reading the disclosure provided herein, one of ordinary skill in the art will understand how to select a particular number of bits or a range of bits to use in a particular application. After reading the disclosure provided herein, one of ordinary skill in the art will also understand how to select or recognize the particular number of bits in a byte used in a particular application. The control signals may be configured to either turn a load on or turn a load off. The control signals may be configured to cause other functions or processes to occur at one or more loads.

It should also be appreciated that although only two devices 54a, 54b are shown in FIG. 5A, a system may comprise any number of devices (e.g., N devices where N is an integer greater than 1). It should also be appreciated that some or all of the devices may correspond to loads (e.g., a load responsive to control signals which turn the load on and/or off). It should also be appreciated that some or all of such devices may correspond to controllers (e.g., devices which may control one or more loads).

In embodiments, a system may further comprise means for training when to turn on and/or off one or more loads such that the means enables a collection or group of loads (where a collection or group may comprise one or more loads) to be turned on and/or off at a given point in time or over a given period of time. In this way, a self-organizing load system may be provided.

The PLC carrier modem may thus be used to produce control signals over a communication channel via a chirp signal having a frequency range extending substantially over a full quasi-peak (QP) frequency peak (QP) frequency band.

In this way, a communication system comprising means for providing control signals over a communication channel via a chirp signal having a frequency range extending substantially over a full quasi-peak (QP) frequency band is provided.

By providing the communication modem with a spread spectrum transmitter and a spread spectrum receiver, the modem described herein may be used as a communication modem for implementing a low bitrate sensing and control protocol over a transmission medium. The transmitter and receiver are configured to transmit and receive spread spectrum signals having a chirp frequency range extending substantially over a quasi-peak (QP) frequency band, the spread spectrum signals correspond to low-bitrate, sensing and control signals. In the example embodiment of FIG. 5A, the modem is configured as a power line communication (PLC) modem for implementing a low bitrate sensing and control protocol over power lines.

Figure 5B:
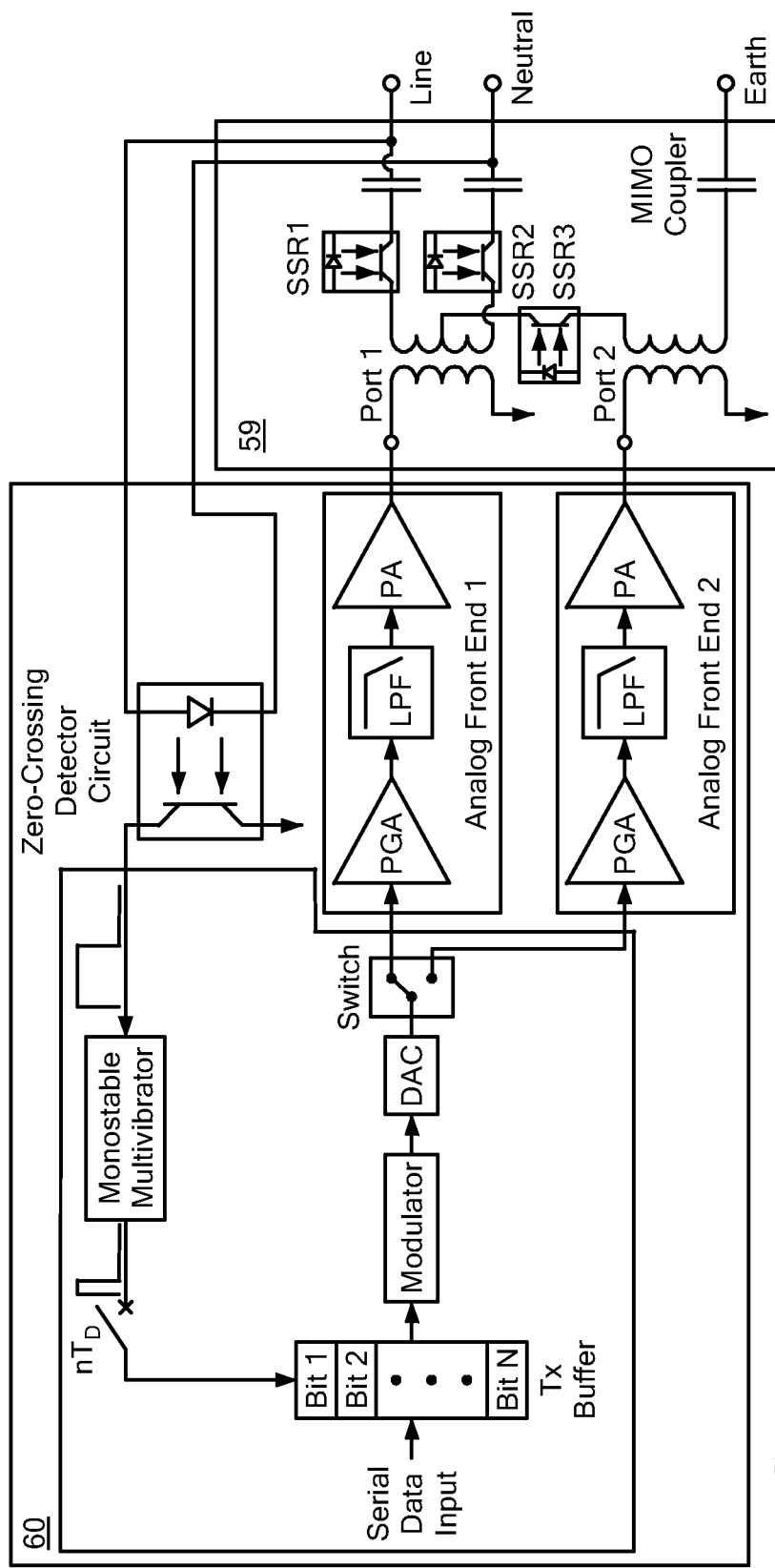
FIG. 5B is a block diagram of a PLC modem transmitter which may be the same as or similar to a type used in the system of FIG. 5A.
Figure 5C:
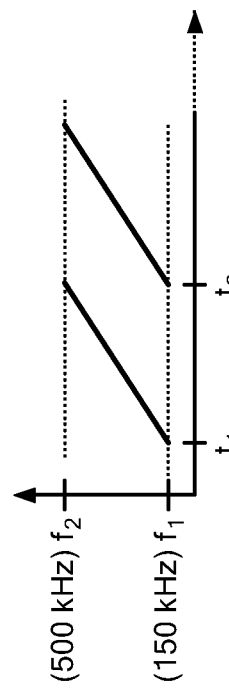
FIG. 5C is a plot of a transmit chirp waveform.

Referring now to FIG. 5B, a PLC transmitter suitable for use in a PLC modem such as one of PLC modems 52a, 52b described above in conjunction with FIG. 5A) includes one or more processors and one or more memories in which is stored a bit to be transmitted. In embodiments, the modem may comprise a microcontroller (MCU) comprising a transmit (Tx) stack buffer in which is stored a bit to be transmitted. In embodiments, the MCU may be provided as a mixed-domain chip that can implement configurable filters and mixers, in addition to performing analog-to-digital and digital-to-analog conversion. In an example embodiment, the MCU of the PLC transmitter is provided as a Cypress PSoC 5LP microcontroller (MCU).

The utility voltage provides a global clock to improve synchronization between different PLC modems. A zero-crossing detector (which may be implemented with an optoisolator, for example) may be used to convert line voltage to a digital voltage-polarity signal. The MCU may comprise a monostable multivibrator configured to trigger on a rising edge of an output of the zero-crossing detector signaling the Tx stack buffer to "pop" the next bit for transmission. A switch temporarily blocks the signal from the monostable multivibrator after each transmission, limiting the data rate to a frequency of 1/TD, where TD is the time period for transmitting a bit.

The MCU modulates the bit from the Tx buffer into a discrete-time chirp signal (e.g., an 8-bit discrete-time chirp signal), and then performs digital-to-analog conversion (DAC). A switch in the MCU and the MIMO coupler's configuration determine the physical PLC channel. The chirp signal is conditioned in the analog front end by the programmable-gain amplifier (PGA), low-pass filter (LPF), and power amplifier (PA) before it reaches the coupler. The transformers and capacitors isolate the low-voltage circuitry from the high-voltage power line. Solid-state relays (SSRs) may be used, for example, to change the connection of the coupler to the electric utility, affecting the physical PLC channel. For instance, when only SSR1 and SSR2 are ON, the line-neutral channel is being used. These circuit elements work together to inject a chirp signal current, which encodes a single bit, into the electric utility. After signal attenuation and corruption by noise, the receiver demodulates the received signal.

Figure 6A:
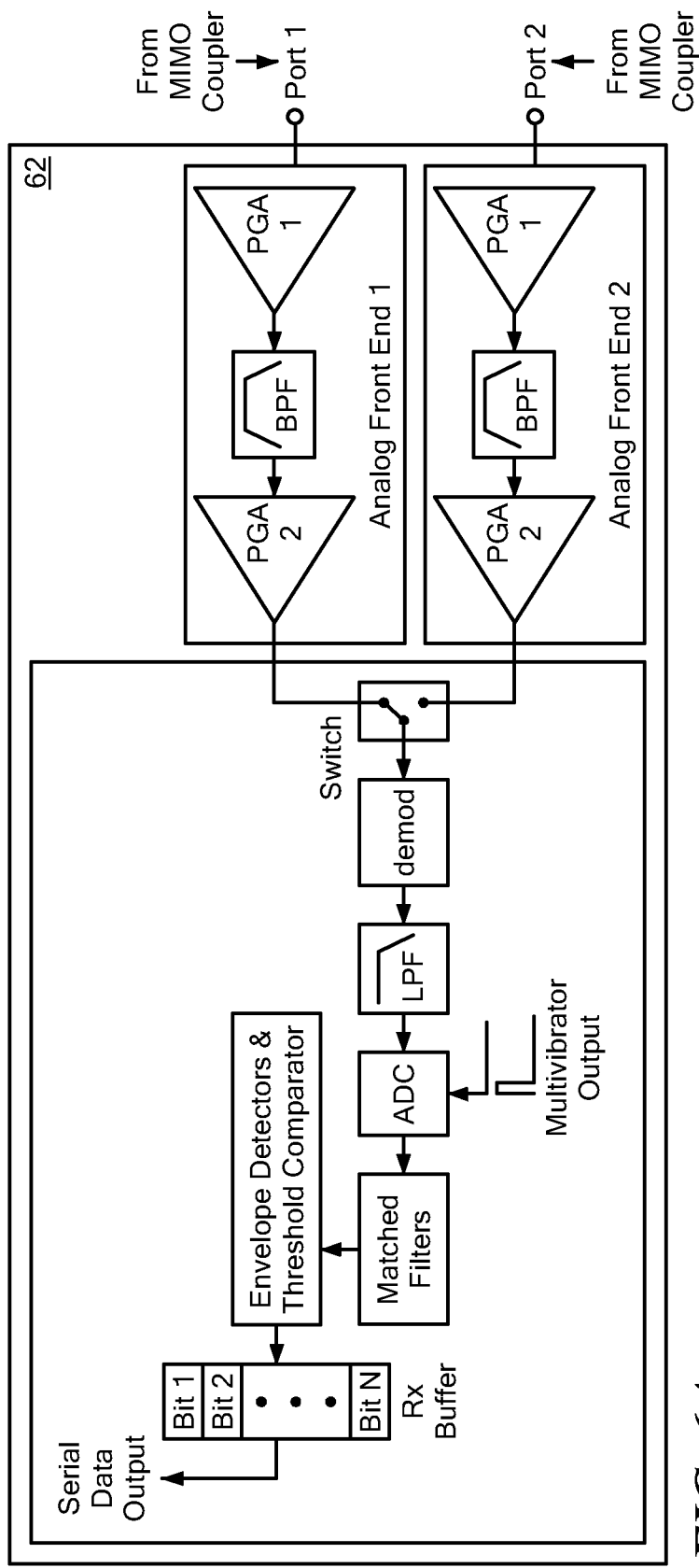
FIG. 6A is a block diagram of a PLC modem receiver which may be the same as or similar to a type used in the system of FIG. 5A.
Figure 6B:
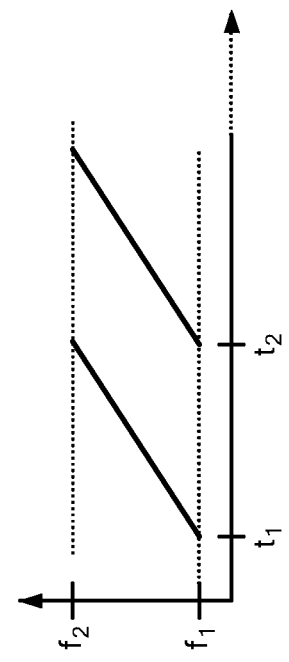
FIG. 6B is a plot of a receive chirp waveform.

Referring now to FIG. 6A, a receiver suitable for use in a PLC modem such as one of PLC modems 52a, 52b described above in conjunction with FIG. 5A of the PLC modem includes a processor which may be provided as a microcontroller. The corrupted signal passes through a MIMO coupler (e.g., one of MIMO couplers 59 described above in conjunction with FIGS. 5A-5B) and into an analog front end which conditions the received signal. The analog front end comprises one or more amplifiers (e.g., low noise amplifiers) and filters (e.g., bandpass filters).

In embodiments, the frontend conditions the received signal using one or more programmable gain amplifiers (PGAs) and a band-pass filter. Similar to the transmitter, a switch in the MCU and the SSRs in the MIMO coupler determine the physical PLC channel. The resulting signal is down-mixed (or down-converted) to baseband in the MCU. The LO frequency is determined by the maximum frequency of the chirp carrier signal. A low pass filter (LPF) prevents aliasing in the sampling stage, and the cut-off frequency of the LPF depends upon the bandwidth of the chirp signal. The receiver includes an analog-to-digital converter (ADC), triggered by the same multivibrator in the transmitter, which converts the received signal to its discrete-time form. This discrete-time received signal is the input to the two matched filters described above, which may be implemented in discrete time, for example. The envelope detectors and threshold comparator perform the operations given in Equations (11)-(14) above to determine the received bit. A receive (Rx) buffer stores the received bit to complete the demodulation process.

To demonstrate the effectiveness of the chirp spread-spectrum technique and PLC modem described herein, a difficult electrical environment for PLC is selected. In this example, a 24-floor high-rise building in the Massachusetts Institute of Technology (MIT) campus is used. The building has challenging attenuation characteristics and provides an excellent testing ground for the proposed PLC technique and hardware.

Figure 7:
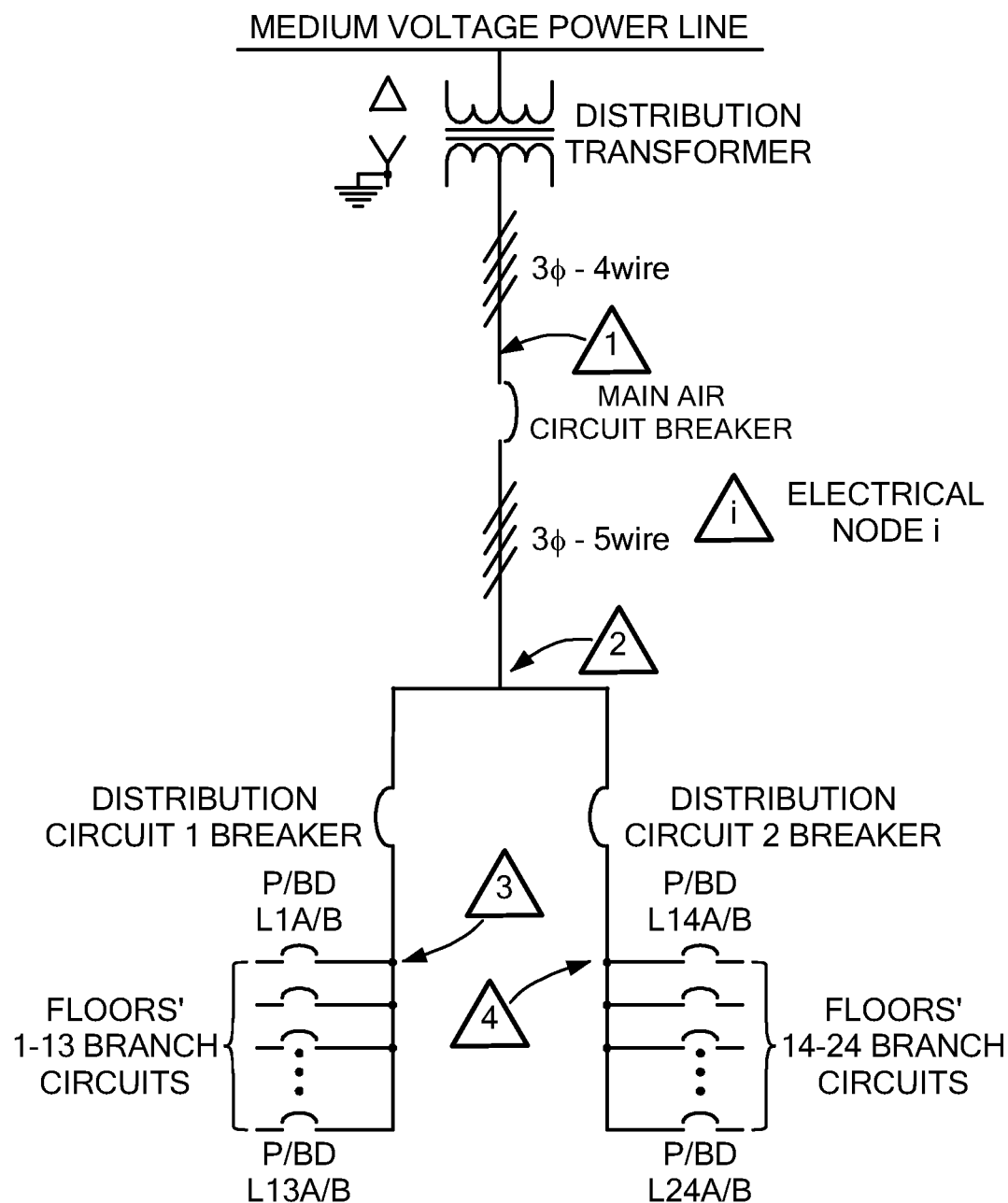
FIG. 7 is a schematic diagram of a 24-floor high-rise apartment building.

The electrical system of the test building is shown in FIG. 7. Power is delivered from an electrical grid through a three-phase delta-wye grounded transformer located in the basement of the building. The main service panel comprises an air circuit breaker fed from a transformer by three-phase four-wire cabling. The neutral and earth are bonded together at node 1 in FIG. 7. An out-going three-phase five-wire cabling splits at node 2 to supply the two main circuits in the building. The building is electrically divided into two groups. Floors one to thirteen are supplied from one main circuit, while fourteen through twenty-four are supplied from the other as indicated in FIG. 7. The main circuits branch out at nodes 3 and 4. Each floor is protected by two circuit breakers in addition to distribution breakers for each main circuit.

Consider a building automation/smart-grid application relying on PLC installed in this building. Controllable loads, such as HVACs and dishwashers, are fitted with PLC modems and connect to different branch circuits located on various floors in the high-rise building. The array of utility connections forms a local communication network. The size and structure of the building's power distribution network increases network complexity and places varying electrical distance between different modems. Depending on the location of two communicating PLC modems, signals must pass through multiple circuit breakers, EMI chokes, and filters. These elements introduce extra obstacles that are not usually present in smaller residential buildings. This typically translates to higher signal attenuation between transmitting and receiving nodes.

To evaluate the attenuation characteristics of the test building, a receiver is placed on the 24th floor, and a transmitter is placed on the 2nd, 13th, 14th, or 24th floor. FIG. 8 presents the attenuation results for the various transmitter locations and utility connections. The results in FIG. 8 are employed to select appropriate physical and spectral PLC channels in this work.

The attenuation of the 24th to 24th floor line-neutral channel is shown in FIG. 8A. The attenuation varies from about 20 dB at 150 kHz to 56 dB at 375 kHz. Due to excessive signal attenuation on the line-neutral channel, the attenuation could not be accurately estimated for the other transmitter locations. Signal attenuation on the neutral-earth and line-earth channels are presented in FIGS. 8B and 8C respectively. The attenuation on the 2nd to 24th and 13th to 24th floor links could not be accurately estimated at frequencies greater than 250 kHz and is not reported.

FIGS. 8B and 8C show that the neutral-earth and line-earth channel attenuation is lower than the line-neutral channel attenuation. Most loads in the building are connected across line and neutral, and the resulting circuit loading causes more pronounced attenuation on that channel. FIGS. 8B and 8C also reveal that moving the transmitter from the 24th to the 14th floor increases the attenuation by about 15 dB on average. However, when the transmitter is moved by one more floor (14th to 13th), the average attenuation increases by an additional 25 dB. The 13th floor is on a different distribution circuit than the 14th and 24th floors, resulting in the rapid increase in attenuation.

Referring again to FIG. 7, it can be observed that communication signals experience more attenuation in this case because they have to travel a longer distance and through more breakers. The attenuation in the 2nd and 13th to 24th floor links are very similar because both transmitting floors are on the same circuit and signal degradation is dominated by crossing from one circuit to the other. NB-PLC attenuation in the test building is about 10-50 dB greater than the attenuation recorded in other buildings which have been tested in conjunction with prior art techniques. Despite the above average challenges of this building's PLC channels, the proposed technique and hardware achieve reliable low-data-rate PLC.

Now that an example test environment has been characterized, the data transmission performance of the proposed low-data-rate PLC technique and hardware can be evaluated. Other modulation schemes, including chirp-BOK and FSK, are also evaluated to show the benefit of the chirp technique when operating at the QP regulatory limit.

In these tests, a transmitting PLC modem is connected to the electric utility on various floors of the above-described test building. The modem's Tx buffer is loaded with a known symbol (bit) sequence to evaluate the detection probability. The receiver modem is connected to the electric utility on the 24th floor and will attempt to decode the transmitted bit sequence. Various symbols rates and power levels are used to measure the transmitted symbol detection probability as a function of symbol rate or signal-to-noise ratio (SNR). To reduce (and ideally minimize) attenuation as shown in FIGS. 8A-8C, a line-earth physical channel and 170-200-kHz spectral channel are used. Consequently, linear chirps with 30-kHz bandwidth and 4 ms duration are employed to modulate the digital data. The receiver's ADC sampling frequency is set to 1 MSps, the receiver LO frequency is 210 kHz, and the anti-aliasing filter cut-off frequency is 45 kHz.

Figure 9:
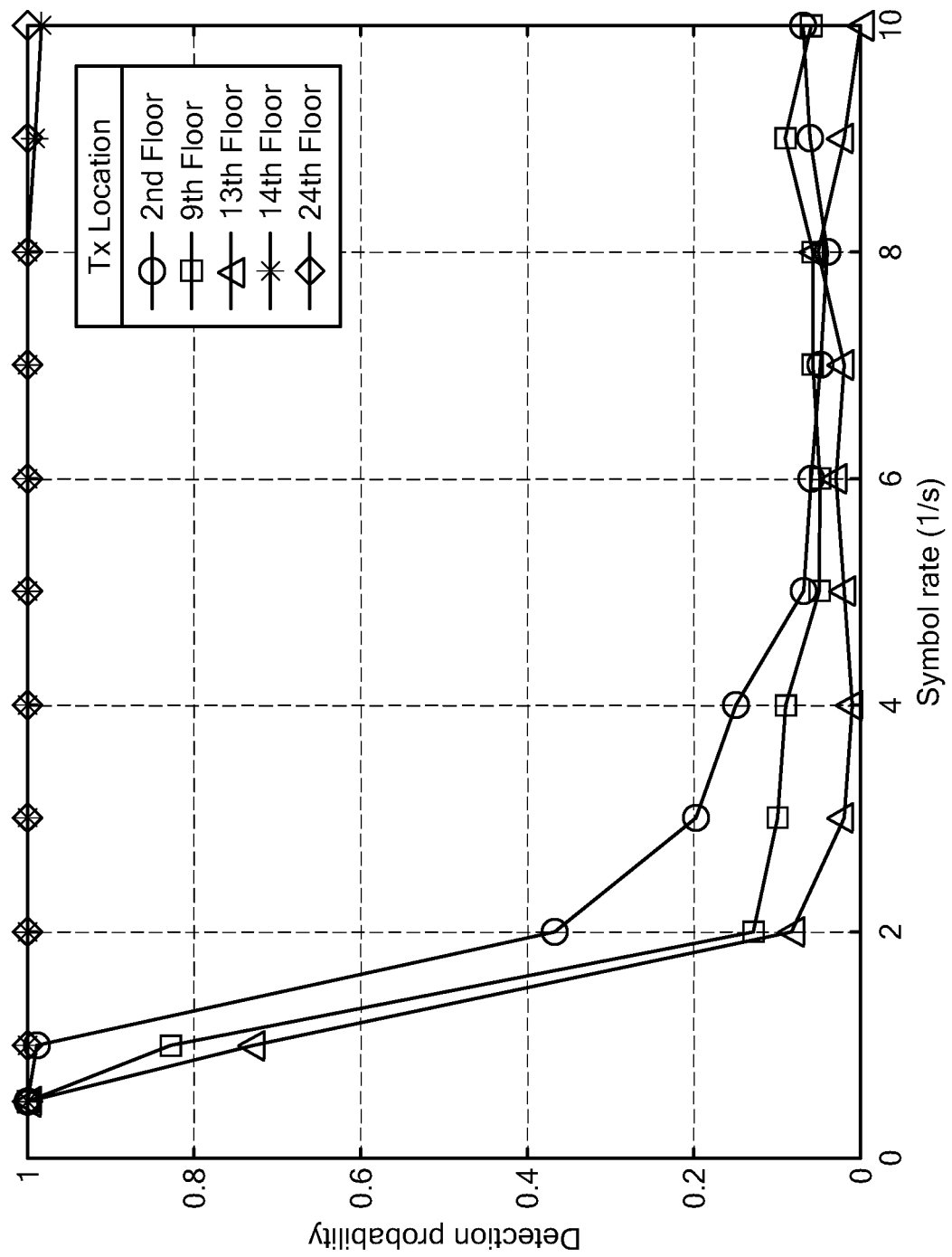
FIG. 9 is a plot of detection probability vs. symbol rate illustrating the impact of transmitter (Tx) location on the performance of a proposed PLC strategy based on QP limits and BOK modulation scheme when a receiver (Rx) is located on the 24th floor.

FIG. 9 provides an overview of communication performance using BOK modulation at the QP regulatory limit. The probability of successfully detecting a symbol is plotted against symbol rate with the transmitter placed on either the 2nd, 9th, 13th, 14th, or 24th floor. The PLC modems maintain high fidelity communication when the transmitter and receiver are on the same distribution circuit, i.e., when the transmitter is placed on the 14th or 24th floor. 100% reliable communication is possible at up to 8 symbols-per-second. In contrast, the PLC modems placed on the 2nd, 9th, and 13th floors drop below 50% reliability at 2 symbols-per-second.

As illustrated in FIGS. 8A-8C, communication between two main distribution circuits in the test building results in heavy attenuation, leading to weak performance PLC. However, the reliability typically remains above 0%, allowing techniques at the data transport layer to make use of the PLC link for low-data-rate applications.

Smart grid applications, such as load control and demand response, are dependent on coverage and reliability rather than communication bandwidth. The proposed technique and hardware meet this challenge by enabling low-data-rate PLC in extremely harsh electrical environments.

The impact of leveraging QP regulation is next described. The QP opportunity described herein permits higher transmission power, but only in the absence of a peak (P) limit. The QP technique described above leverages the measurement circuit to maximize the signal energy for each symbol. Without a P limit, the QP limit values may be used as a substitute which result in PLC modems having higher reliability and coverage than prior art PLC modems designed with a P limit.

Figure 10:
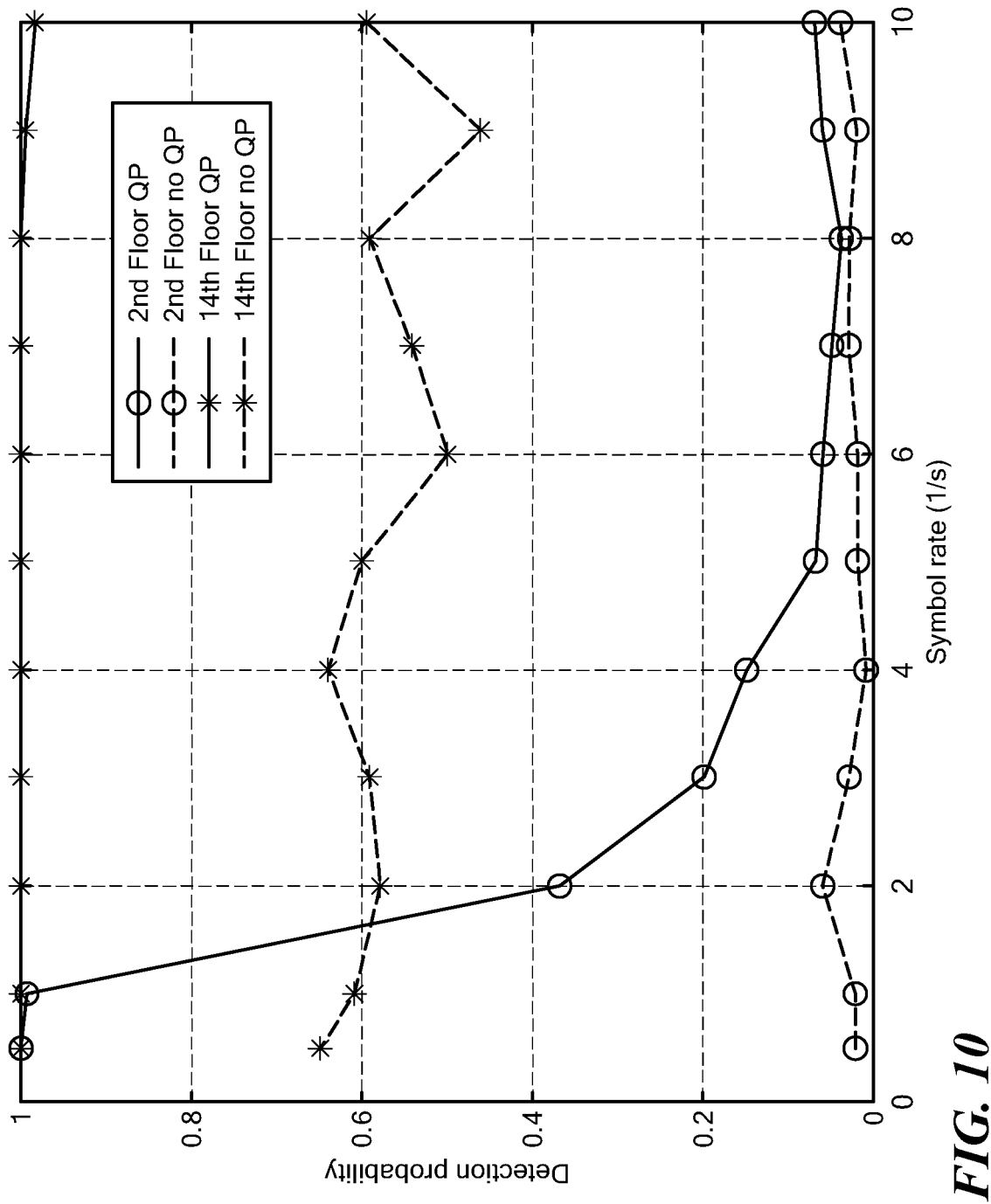
FIG. 10 is a plot of detection probability vs. symbol rate illustrating the effect of leveraging QP regulations on BOK modulation scheme performance with Tx located on the 2nd and 14th floors and Rx located on the 24th floor.

FIG. 10 demonstrates this effect by displaying new 2nd and 14th floor tests with the transmitter peak power equal to the QP limit. FIG. 10 shows the reduced communication reliability resulting from lower transmission power. The detection probability from the 14th floor drops by 40-50% across the measured symbol-rate range. In the 2nd floor case, the probability drops by as much as 90%. Thus, leveraging the QP opportunity is necessary to maximize the coverage and reliability of low-data-rate PLC modems.

The chirp signal better utilizes the QP opportunity by interacting with the IF filter to shorten the measured pulse width. A single frequency carrier scheme, such as FSK, does not have this advantage and must transmit at lower power for the same pulse width.

Figure 11:
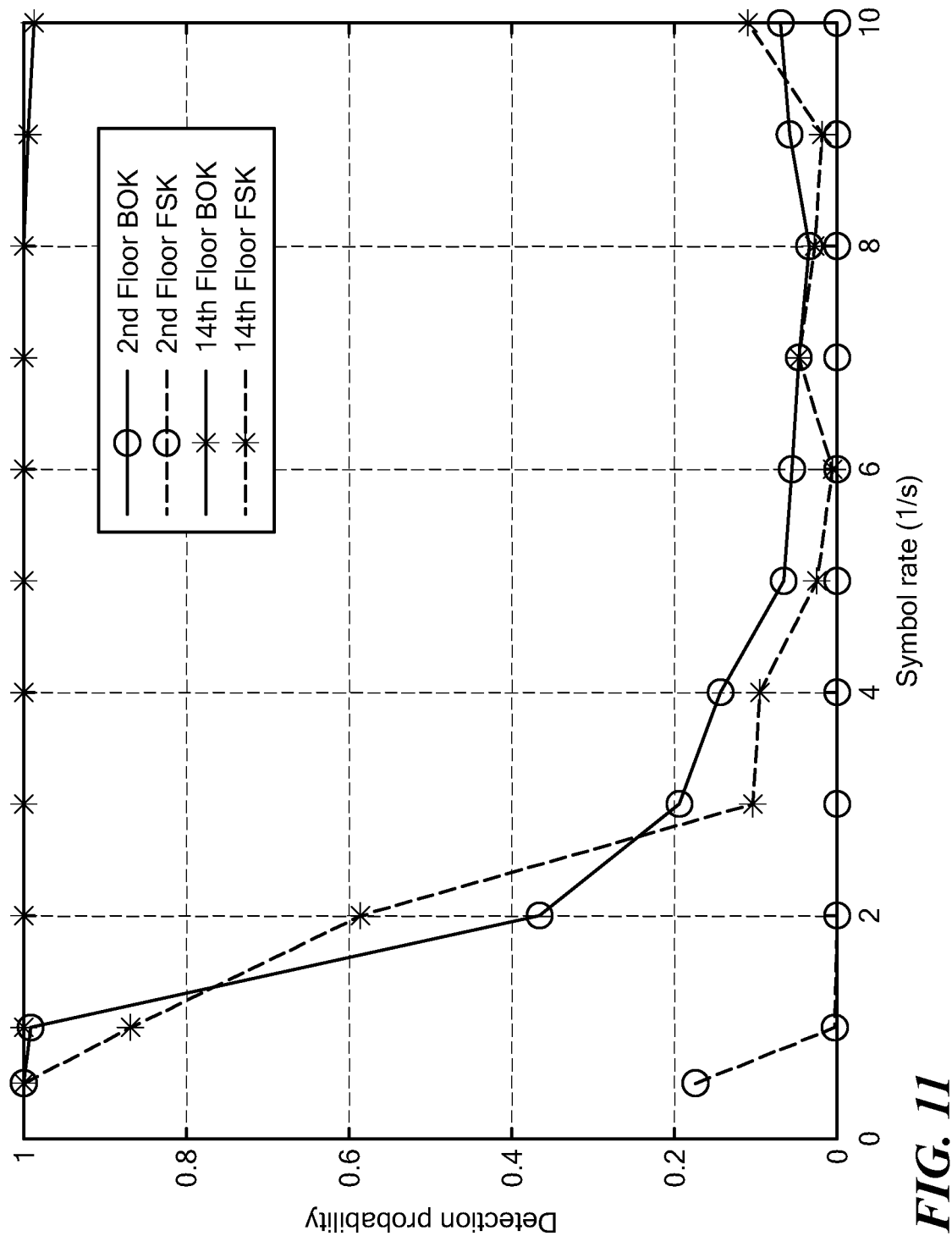
FIG. 11 is a plot of detection probability vs. symbol rate illustrating performance comparison between BOK and FSK modulation schemes with Tx located on the 2nd and 14th floors and Rx located on the 24th floor.

FIG. 11 demonstrates the disadvantage posed by FSK. Here, 170-kHz and 180-kHz sinusoidal carriers represent "1" and "0" respectively. Again, the transmitter is placed on either the 2nd or 14th floor for these tests. In either case, the FSK performance is dramatically lower than the proposed chirp-BOK technique. In the 2nd floor case, the reliability drops by as much as 95%. Further, a FSK-based PLC link cannot be established at or above 2 symbols-per-second. This test demonstrates that the proposed BOK modulation scheme improves communication fidelity compared to FSK by permitting higher transmitted power level.

The receiver operating characteristics (ROC) indicates the reliability of a receiver with respect to SNR.

Figure 12:
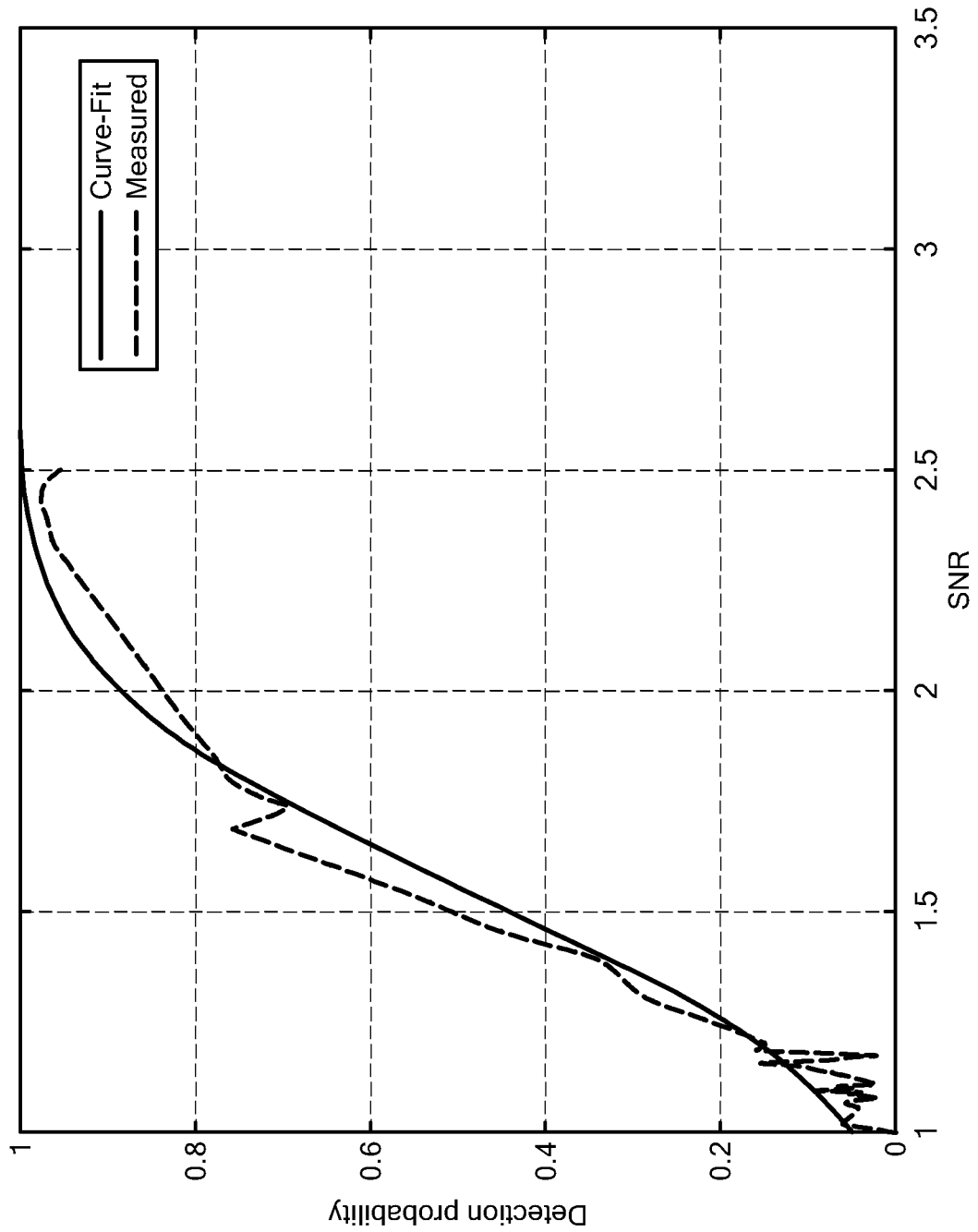
FIG. 12. is a plot of detection probability vs. signal to noise ratio (SNR) illustrating proposed receiver operating characteristics showing the impact of matched filter's output SNR on symbol detection rate.

FIG. 12 illustrates the ROC of a PLC modem provided in accordance with the concepts described herein when utilizing the full QP opportunity with chirp-BOK modulation. The curve utilizes the data collected for various transmitter locations. The SNR is calculated based on the output of the matched filter. The plot also gives a curve fit with an exponential function. The ROC allows a PLC system designer to estimate the performance of PLC modems based on known channel characteristics and transmission power. The ROC permits estimation of performance when error-correction codes (ECC) are employed.

Various embodiments of the concepts systems and techniques are described herein with reference to the related drawings. Alternative embodiments can be devised without departing from the scope of the described concepts. It is noted that various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to element or structure "A" over element or structure "B" include situations in which one or more intermediate elements or structures (e.g., element "C") is between element "A" and element "B" regardless of whether the characteristics and functionalities of element "A" and element "B" are substantially changed by the intermediate element(s).

The following definitions and abbreviations are to be used for the interpretation of the claims and the specification.

As used herein, the terms "comprises," "comprising," "includes," "including," "has," "having," "contains" or "containing," or any other variation thereof, are intended to cover a non-exclusive inclusion. For example, a method, article, or apparatus that comprises a list of elements is not necessarily limited to only those elements but can include other elements not expressly listed or inherent to such method, article, or apparatus.

Additionally, the term "exemplary" is used herein to mean "serving as an example, instance, or illustration." Any embodiment or design described herein as "exemplary" is not necessarily to be construed as preferred or advantageous over other embodiments or designs. The terms "one or more" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

References in the specification to "one embodiment," "an embodiment," "an example embodiment," or variants of such phrases indicate that the embodiment described can include a particular feature, structure, or characteristic, but every embodiment can include the particular feature, structure, or characteristic. Moreover, such phrases are not necessarily referring to the same embodiment. Further, when a particular feature, structure, or characteristic is described in connection knowledge of one skilled in the art to affect such feature, structure, or characteristic in connection with other embodiments whether or not explicitly described.

Furthermore, it should be appreciated that relative, directional or reference terms (e.g. such as "above," "below," "left," "right," "top," "bottom," "vertical," "horizontal," "front," "back," "rearward," "forward," etc.) and derivatives thereof are used only to promote clarity in the description of the figures. Such terms are not intended as, and should not be construed as, limiting. Such terms may simply be used to facilitate discussion of the drawings and may be used, where applicable, to promote clarity of description when dealing with relative relationships, particularly with respect to the illustrated embodiments. Such terms are not, however, intended to imply absolute relationships, positions, and/or orientations. For example, with respect to an object or structure, an "upper" surface can become a "lower" surface simply by turning the object over. Nevertheless, it is still the same surface and the object remains the same. Also, as used herein, "and/or" means "and" or "or", as well as "and" and "or." Moreover, all patent and non-patent literature cited herein is hereby incorporated by references in their entirety.

The terms "disposed over," "overlying," "atop," "on top," "positioned on" or "positioned atop" mean that a first element, such as a first structure, is present on a second element, such as a second structure, where intervening elements or structures (such as an interface structure) may or may not be present between the first element and the second element. The term "direct contact" means that a first element, such as a first structure, and a second element, such as a second structure, are connected without any intermediary elements or structures between the interface of the two elements.

Having described exemplary embodiments, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A communication system comprising:
   (a) a device;
   (b) a transmission medium; and
   (c) a modem coupled between the device and the transmission medium, the modem configured to:
      (c1) receive signals from the device and modulate the received signals for transmission over the transmission medium with a spread spectrum chirp transmitter as modulated spread spectrum chirp signals, transmit the modulated spread spectrum chirp signals as binary data by: (a) defining a bit time interval during which a single bit of data is to be communicated; (b) converting each data bit to a first signal waveform having a first binary condition in at least one portion of the bit time interval and having the remaining binary condition in other portions of the bit time interval; (c) integrating the first signal waveform to obtain a ramp waveform; and (d) providing the ramp waveform to a control input of a spread spectrum transmitter;
      (c2) receive modulated spread spectrum chirp signals propagating on the transmission medium, demodulate the received modulated spread spectrum chirp signals and provide demodulated spread spectrum chirp signals to the device; and
      (c3) meet quasi-peak (QP) signal levels.

2. The communication system of claim 1 wherein the modem is configured to modulate the signals with a chirp signal having a frequency range extending substantially over a full quasi-peak (QP) frequency band.

3. The communication system of claim 1 wherein the device is one of: a controller, a sensor, or any controllable device.

4. A communication modem for implementing a low bitrate sensing and control protocol over a transmission medium, the communication modem comprising:
   a spread spectrum transmitter configured to transmit spread spectrum signals having a chirp frequency range extending substantially over a quasi-peak (QP) frequency band, the transmitted spread spectrum signals corresponding to low-bitrate, sensing and control signals; and
   a spread spectrum receiver configured to receive spread spectrum signals having a chirp frequency range extending substantially over the quasi-peak (QP) frequency band, the received spread spectrum signals corresponding to low-bitrate, sensing and control signals;
   wherein the spread spectrum transmitter is configured to transmit binary data by:
      defining a bit time interval during which a single bit of data is to be communicated;
      converting each data bit to a first signal waveform having a first binary condition in at least one portion of the bit time interval and having the remaining binary condition in other portions of the bit time interval;
      integrating the first signal waveform to obtain a ramp waveform; and
      providing the ramp waveform to a control input of the spread spectrum transmitter.

5. The communication modem of claim 4 wherein the communication modem is configured as a power line communication (PLC) modem for implementing a low bitrate sensing and control protocol over power lines.

6. The communication modem of claim 5 wherein the transmission medium is at least one of: a wireless signal path, an optical signal path or a wired signal path.

7. The communication modem of claim 4 wherein the:
   the spread spectrum transmitter is configured to receive signals from a device and modulate the signals for transmission over a power line; and
   the spread spectrum receiver is configured to receive modulated spread spectrum chirp signals propagating on a power line, demodulate the spread spectrum signals and provide the demodulated signals to a device wherein emission levels of the spread spectrum signals meet quasi-peak (QP) regulatory limits.

8. The communication modem of claim 4 wherein:
   a center frequency of the spread spectrum transmitter is set by magnitude of the ramp waveform provided to the control input of the spread spectrum transmitter; and
   the ramp waveform is provided as an input waveform to the control input of the spread spectrum transmitter to:
      vary an instantaneous frequency of a signal at an output of the spread spectrum transmitter to have a center frequency at a beginning, a midpoint and an end of each bit time interval; and have a maximum frequency, greater than the center frequency, and a minimum frequency, less than the center frequency, transmit a first data bit having a first binary data value at the minimum frequency and transmit a second data bit having a second binary data value at the maximum frequency.

9. The system of claim 4 wherein the spread spectrum receiver is configured to recover binary data contained in an output waveform signal received at the spread spectrum receiver by:
(i) frequency-demodulating frequency variations of the received signal;
(ii) integrating the frequency-demodulated signal; and
(iii) comparing the integrated frequency-demodulated signal with a reference level to obtain a binary value of each data bit sent by a spread spectrum transmitter.

10. The communication modem of claim 4 wherein:
a center frequency of the spread spectrum transmitter is set with a predetermined input waveform magnitude at the control input of the spread spectrum transmitter to vary an instantaneous frequency of a signal at an output of the spread spectrum transmitter to have a first center frequency at a beginning of a bit time interval, a second center frequency at a midpoint of the bit time interval and a third center frequency at an end of the bit time interval; and
the first, second, and third center frequencies are not the same frequency.

11. The communication modem of claim 10 wherein:
to transmit a data bit having a first binary data value, the first center frequency corresponds to a frequency which is greater than the second center frequency and the third center frequency corresponds to a frequency which is less than the second center frequency; and
to transmit a data bit having a second binary data value, the first center frequency corresponds to a frequency which is less than the second center frequency and the third center frequency corresponds to a frequency which is greater than the second center frequency.

12. A communication system comprising:
(a) a device;
(b) a transmission medium; and
(c) a modem coupled between the device and the transmission medium, the modem configured to:
(c1) receive signals from the device and modulate the signals for transmission over the transmission medium with a spread spectrum chirp transmitter; and
(c2) receive modulated spread spectrum chirp signals propagating on the transmission medium, (i) frequency-demodulate frequency variations of the received spread spectrum chirp signals; (ii) integrate the frequency-demodulated spread spectrum chirp signals; (iii) compare the integrated and frequency-demodulated spread spectrum chirp signals with a reference level to recover binary data by obtaining a binary value of each data bit in the received modulated spread spectrum chirp signals; and provide the recovered binary data to the device; and
(c3) meet quasi-peak (QP) signal levels.

13. The communication system of claim 12 wherein the modem is configured as a power line communication (PLC) modem for implementing a low bitrate sensing and control protocol over power lines.

14. The communication system of claim 12 wherein the communication modem is configured to:
receive signals from the device and modulate the signals for transmission over the transmission medium; and
receive modulated spread spectrum chirp signals propagating on the transmission medium, demodulate the modulated spread spectrum chirp signals and provide the demodulated spread spectrum chirp signals to the device wherein emission levels of the spread spectrum chirp signals meet quasi-peak (QP) regulatory limits.

15. The communication system of claim 12 wherein the transmission medium is at least one of: a wireless signal path, an optical signal path or a wired signal path; a power line.

16. A communication modem for implementing a low bitrate sensing and control protocol over a transmission medium, the communication modem comprising:
a spread spectrum transmitter configured to transmit spread spectrum signals having a chirp frequency range extending substantially over a quasi-peak (QP) frequency band, the transmitted spread spectrum signals corresponding to low-bitrate, sensing and control signals; and
a spread spectrum receiver configured to receive spread spectrum signals having a chirp frequency range extending substantially over a quasi-peak (QP) frequency band, the received spread spectrum signals corresponding to low-bitrate, sensing and control signals;
wherein the spread spectrum receiver is configured to recover binary data contained in an output waveform signal received at the spread spectrum receiver by:
(i) frequency-demodulating frequency variations of the received signal;
(ii) integrating the frequency-demodulated signal; and
(iii) comparing the integrated frequency-demodulated signal with a reference level to obtain a binary value of each data bit sent by a spread spectrum transmitter.

17. The communication modem of claim 16 wherein the spread spectrum signals provided by the spread spectrum transmitter are configured to control loads over a communication channel.

18. The communication modem of claim 16 wherein the spread spectrum transmitter is configured to receive signals from a device and modulate the signals for transmission over a transmission medium as the transmitted spread spectrum signals corresponding to low-bitrate, sensing and control signals.

19. The communication modem of claim 16 wherein the spread spectrum transmitter is configured to transmit binary data by:
defining a bit time interval during which a single bit of data is to be communicated;
converting each data bit to a first signal waveform having a first binary condition in at least one portion of the bit time interval and having the remaining binary condition in other portions of the bit time interval;
integrating the first signal waveform to obtain a ramp waveform;
providing the ramp waveform to a control input of a transmitter.

20. The communication modem of claim 19 wherein the ramp waveform is provided to the transmitter control input to vary an instantaneous frequency of a signal at the transmitter output.

* * * * *